(12) United States Patent
Seki et al.

(10) Patent No.: US 10,462,325 B2
(45) Date of Patent: Oct. 29, 2019

(54) IMAGE READING APPARATUS, CONTROL METHOD, AND CONTROL PROGRAM

(71) Applicant: PFU LIMITED, Kahoku-shi, Ishikawa (JP)

(72) Inventors: Kazuhito Seki, Kahoku (JP); Shingo Kanaya, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 16/080,605

(22) PCT Filed: Aug. 10, 2016

(86) PCT No.: PCT/JP2016/073670
§ 371 (c)(1),
(2) Date: Aug. 28, 2018

(87) PCT Pub. No.: WO2017/149802
PCT Pub. Date: Sep. 8, 2017

(65) Prior Publication Data
US 2019/0020779 A1    Jan. 17, 2019

(30) Foreign Application Priority Data
Mar. 3, 2016    (WO) .................. PCT/JP2016/056656

(51) Int. Cl.
*H04N 1/04*    (2006.01)
*H04N 1/047*    (2006.01)
(Continued)

(52) U.S. Cl.
CPC ......... *H04N 1/047* (2013.01); *H04N 1/00005* (2013.01); *H04N 1/00029* (2013.01);
(Continued)

(58) Field of Classification Search
CPC .............. H04N 1/047; H04N 1/00005; H04N 1/00029; H04N 1/00037; H04N 1/00602
(Continued)

(56) References Cited

U.S. PATENT DOCUMENTS

| | | | |
|---|---|---|---|
| 2005/0254103 A1 | 11/2005 | Sugiyama et al. | |
| 2011/0188099 A1* | 8/2011 | Lee ........................ | H04N 1/04 358/498 |

(Continued)

FOREIGN PATENT DOCUMENTS

| | | |
|---|---|---|
| JP | 11-187271 A | 7/1999 |
| JP | 2005-065033 A | 3/2005 |

(Continued)

OTHER PUBLICATIONS

English translation of Office action issued in related Japanese Application No. 2016-041177, dated Oct. 25, 2016, 3 pages.

(Continued)

*Primary Examiner* — Cheukfan Lee
(74) *Attorney, Agent, or Firm* — Lewis Roca Rothgerber Christie LLP

(57) ABSTRACT

A image reading apparatus includes a first unit fixed to the image reading apparatus, a second unit movably provided between a first position facing the first unit and a second position facing the first unit, wherein the second position is at a longer distance from the first unit than the first position, a guide provided for guiding a document being conveyed between the first unit and the second unit, such that the second unit is moved by the document, an image capturing device provided on one of the first unit and the second unit for capturing an image of a document guided by the guide, a drive force generating device for generating first drive force for moving the second unit, and a control module for (Continued)

causing the drive force generating device to generate the first drive force when the document is not conveyed.

8 Claims, 26 Drawing Sheets

(51) Int. Cl.
    *H04N 1/19*     (2006.01)
    *H04N 1/409*     (2006.01)
    *H04N 1/00*     (2006.01)
    *H04N 1/32*     (2006.01)

(52) U.S. Cl.
    CPC ..... *H04N 1/00037* (2013.01); *H04N 1/00602* (2013.01); *H04N 1/04* (2013.01); *H04N 1/19* (2013.01); *H04N 1/3263* (2013.01); *H04N 1/32625* (2013.01); *H04N 1/409* (2013.01); *H04N 1/4097* (2013.01)

(58) Field of Classification Search
    USPC ......................... 358/408, 496, 498, 474, 488
    See application file for complete search history.

(56) References Cited

U.S. PATENT DOCUMENTS

| | | | | |
|---|---|---|---|---|
| 2011/0292473 A1* | 12/2011 | Cui | ........................ | H04N 1/121 358/498 |
| 2012/0013955 A1* | 1/2012 | Ikeda | ..................... | H04N 1/203 358/461 |
| 2014/0078558 A1 | 3/2014 | Kanaya | | |
| 2014/0079460 A1* | 3/2014 | Kanaya | .................... | B65H 7/14 400/583 |
| 2015/0022868 A1 | 1/2015 | Shimizu | | |
| 2017/0257295 A1* | 9/2017 | Vaindiner | ........... | H04L 43/0811 |
| 2018/0376028 A1* | 12/2018 | Kanaya | ............... | H04N 1/00602 |
| 2019/0098174 A1* | 3/2019 | Kanaya | ................ | H04N 1/4097 |

FOREIGN PATENT DOCUMENTS

| | | |
|---|---|---|
| JP | 2005-328216 | 11/2005 |
| JP | 2010-010867 A | 1/2010 |
| JP | 2010-177745 | 8/2010 |
| JP | 2011-087213 | 4/2011 |
| JP | 2011-259164 A | 12/2011 |
| JP | 2012-204972 | 10/2012 |
| JP | 2014-060488 A | 4/2014 |
| JP | 2015-023379 A | 2/2015 |

OTHER PUBLICATIONS

English translation of International Search Report (dated Sep. 8, 2017) and Written Opinion (dated Apr. 5, 2016) of related PCT Application No. PCT/JP2016/056656, 5 pages.
International Preliminary Report on Patentability of related PCT Application No. PCT/JP2016/056656, dated Sep. 4, 2018, 5 pages.
Office Action of related U.S. Appl. No. 15/178,139, dated Jun. 2, 2017, 13 pages.
English translation of International Search Report (dated Sep. 8, 2017) and Written Opinion (dated Aug. 22, 2018) of related PCT Application No. PCT/JP2016/073670, 12 pages.
International Preliminary Report on Patentability of related PCT Application No. PCT/JP2016/073670, dated Sep. 4, 2018, 8 pages.
English translation of related Chinese Application No. 201610861176.5, Sep. 21, 2018, 6 pages.
Japanese Office Action dated May 14, 2019 regarding Japanese Patent Application No. 2018-502505 corresponding to U.S. Appl. No. 16/080,605 (4 pages) with English Translation (5 pages).

* cited by examiner

IMAGE READING APPARATUS, CONTROL METHOD, AND CONTROL PROGRAM

CROSS-REFERENCE TO RELATED APPLICATION(S)

This application is a U.S. National Phase Patent Application and claims priority to and the benefit of International Application Number PCT/JP2016/073670, filed on Aug. 10, 2016, which claims priority to International Application Number PCT/JP2016/056656, filed on Mar. 3, 2016, the entire contents of all of which are incorporated herein by reference.

FIELD

The present disclosure relates to image reading apparatus, control method and control program, and more particularly, image reading apparatus, control method and control program for capturing an image of a document to be conveyed.

BACKGROUND

In recent years, an image reading apparatus such as a scanner is used in which two optical units having an image capturing device or an illumination unit are provided to face each other across a document conveyance path. In the image reading apparatus when images of documents having various thicknesses are captured such as a copy paper, a thick paper, a plastic card etc., to prevent the occurrence of an out-of-focus, an unevenness of brightness etc., one optical unit is movably provided depending on the thickness of the document to be conveyed.

A copying machine including a CIS having its reading surface coated to prevent reading vertical stripes generated as a paste-like foreign object attached to a document adheres to the reading surface is disclosed. The copying machine detects the thickness of the document and adjusts the gap between the glass surface of the CIS and the roller portion of a reading roller in accordance with the detection result (see patent literature 1).

CITATIONS LIST

Patent Literature

Patent literature 1: Japanese Unexamined Patent Publication (Kokai) No. 2011-87213

SUMMARY

Technical Problem

In the image reading apparatus, there is a case where the unit provided so as to be moved by the document to be conveyed is desirably and forcibly moved at a specific timing.

An object of the image reading apparatus, the control method, and the control program is to forcibly move the unit provided so as to be moved by the document to be conveyed at an appropriate timing.

The image reading apparatus according to an embodiment includes a first unit fixed to the image reading apparatus, a second unit movably provided between a first position facing the first unit and a second position facing the first unit and more separated from the first unit than the first position, a guide provided such that the second unit moves by a document to be conveyed for guiding the document between the first unit and the second unit, an image capturing device provided on one of the first unit or the second unit for capturing an image of a document guided by the guide, a drive force generating device for generating first drive force for moving the second unit, and a control module for causing the drive force generating device to generate the first drive force when the document is not conveyed.

The control method according to an embodiment is a method of an image reading device including a first unit fixed to the image reading apparatus, a second unit movably provided between a first position facing the first unit and a second position facing the first unit and more separated from the first unit than the first position, a guide provided such that the second unit moves by a document to be conveyed for guiding the document between the first unit and the second unit, an image capturing device provided on one of the first unit or the second unit for capturing an image of a document guided by the guide and a drive force generating device for generating first drive force for moving the second unit, the method includes causing the drive force generating device to generate the first drive force when the document is not conveyed.

The control program according to an embodiment is a program of an image reading device including a first unit fixed to the image reading apparatus, a second unit movably provided between a first position facing the first unit and a second position facing the first unit and more separated from the first unit than the first position, a guide provided such that the second unit moves by a document to be conveyed for guiding the document between the first unit and the second unit, an image capturing device provided on one of the first unit or the second unit for capturing an image of a document guided by the guide and a drive force generating device for generating first drive force for moving the second unit, the program causing the image reading device to execute, causing the drive force generating device to generate the first drive force when the document is not conveyed.

Advantageous Effects of Invention

According to the present embodiment, the image reading apparatus, the control method, and the control program can forcibly move the unit provided so as to be moved by the document to be conveyed at the appropriate timing.

The object and advantages of the invention will be realized and attained by means of the elements and combinations, in particular, pointed out in the claims. It is to be understood that both the foregoing general description and the following detailed description are exemplary and explanatory, and are not restrictive of the invention, as claimed.

DESCRIPTION OF EMBODIMENTS

Hereinafter, a document conveying apparatus according to an embodiment, will be described with reference to the drawings. However, it should be noted that the technical scope of the invention is not limited to these embodiments, and extends to the inventions described in the claims and their equivalents.

First Embodiment

Figure 1:
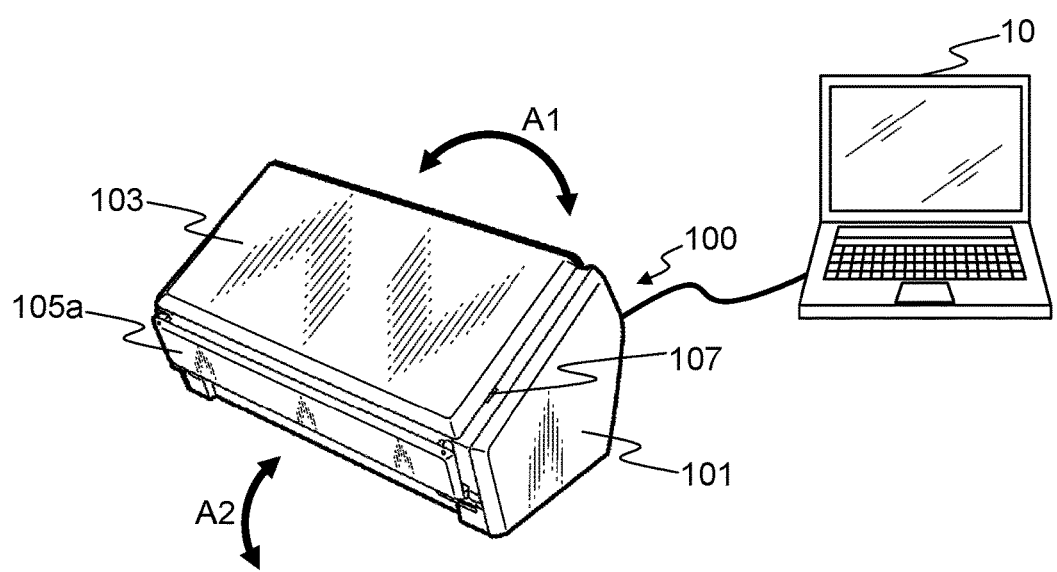
FIG. 1 is a configuration diagram of one example of an image processing system according to an embodiment.

FIG. 1 illustrates a configuration diagram of one example of the image processing system according to an embodiment.

The image reading apparatus of a present embodied example is configured as an image reading apparatus 100 such as an image scanner. The image processing system 1 includes the image reading apparatus 100 and an information processing apparatus 10. In FIG. 1, the image reading apparatus 100 is depicted by a perspective illustration.

The image reading apparatus 100 includes a lower housing 101, an upper housing 102, a document tray 103, a front surface cover 105a and an opening/closing detector 107, etc. The image reading apparatus 100 is connected to the information processing apparatus 10. The image processing apparatus 10 is a personal computer, or a personal digital assistant, for example.

Figure 2:
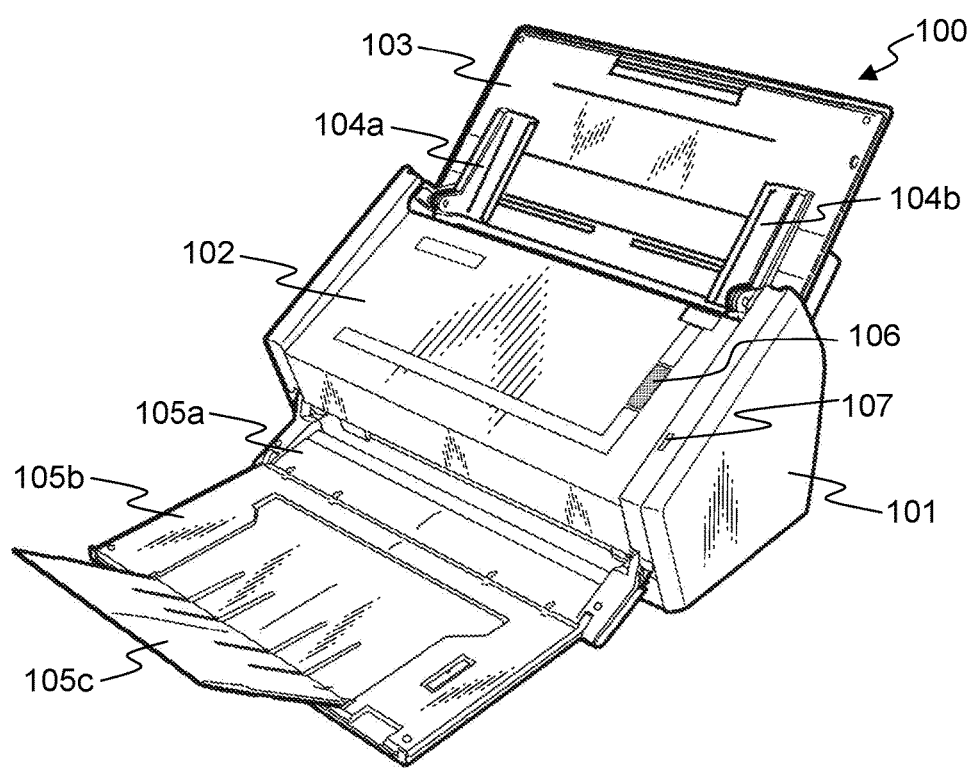
FIG. 2 is a perspective view of an image reading apparatus 100 to which a document tray 103 has been set.

FIG. 2 is a perspective view of the image reading apparatus 100 where the document tray 103 is set.

The image reading apparatus 100 includes an upper surface cover 105b, an auxiliary cover 105c, and operation button 106. The document tray 103 engages the lower housing 101 by hinges so as to be rotated in the direction indicated by the arrow A1. In a state of FIG. 1, the document tray 103 is arranged at a position where the document tray 103 covers the upper housing 102, the upper surface cover 105b, and the auxiliary cover 105c. Thus, the document tray 103 functions as an exterior cover.

On the other hand, in the state as depicted in FIG. 2, the document tray 103 is arranged such that documents can be placed on the document tray 103. Provided in the document tray 103 are side guides 104a and 104b that are movable in the right and left directions of the conveyance direction of a document. The side guides 104a and 104b are aligned with a width of a document to restrict the document in the width direction of the document.

The front surface cover 105a engages the lower housing 101 by hinges so as to be rotated in the direction indicated by the arrow A2. The upper surface cover 105b is connected at one end to the front surface cover 105a, and is connected at the other end to the auxiliary cover 105c. When it is necessary, the auxiliary cover 105c is let out from the upper surface cover 105b to hold a document.

The operation button 106 is arranged on the surface of the upper housing 102, which button generates and outputs an operation detection signal by pressing down. The opening/closing detector 107 includes a contact detecting sensor arranged at a position that faces the document tray 103 in a closed state, and detects an opened state and a closed state of the document tray 103. The opening/closing detector 107 generates and outputs an opening/closing detection signal of which signal value changes by the state of the document tray 103 whether it is open or closed.

Figure 3:
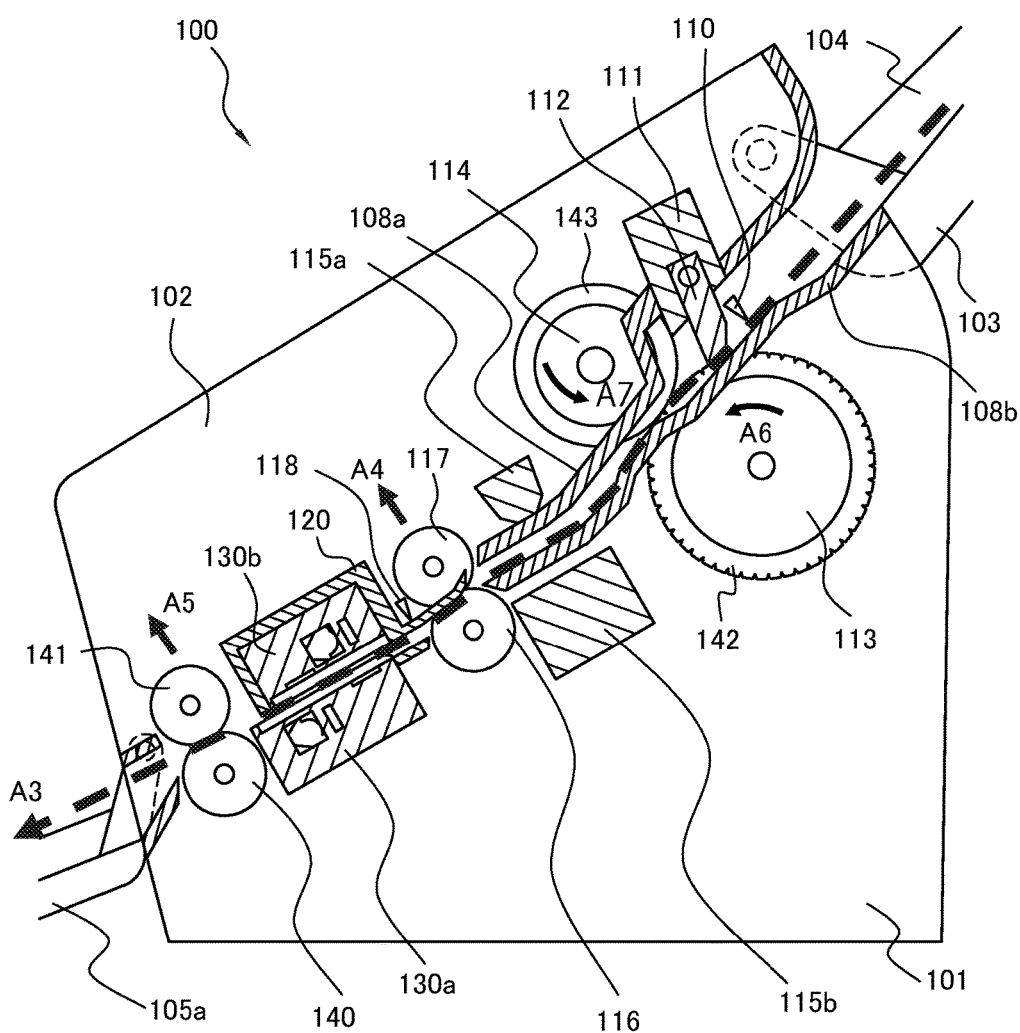
FIG. 3 is a diagram illustrating a transfer path inside the image reading apparatus 100.

FIG. 3 illustrates a conveyance path inside the image reading apparatus 100. The image reading apparatus 100 includes a first sensor 110, a pick arm 111, a flap 112, a sheet feeding roller 113, a retard roller 114, an ultrasonic wave transmitter 115a, an ultrasonic wave receiver 115b, a first conveyance roller 116, and a first driven roller 117. The image reading apparatus 100 includes a second sensor 118, an imaging unit guide 120, a first imaging unit 130a, a second imaging unit 130b, a second conveyance roller 140 and a second driven roller 141, etc.

A lower surface of the upper housing 102 forms an upper guide 108a of the document conveyance path, and an upper surface of the lower housing 101 forms a lower guide 108b of the document conveyance path. In FIG. 3, the arrow A3 indicates the conveyance direction of a document. In the following, the term "upstream" means "upstream in the conveyance direction A3", and the term "downstream" means "downstream in the conveyance direction A3.

The first sensor 110 is a contact detecting sensor, and is arranged in the upstream side of the pick arm 111, and detects whether or not a document is placed on the document tray 103. The first sensor 110 generates and outputs a first document detection signal of which signal value changes by the state whether or not a document is placed on the document tray 103.

The sheet feeding roller 113 is supported by a main body unit of the image reading apparatus 100 in a rotation-free manner. Provided in an outer circumferential surface of the sheet feeding roller 113 is a contact material 142 that contacts a document placed on the document tray 103. The contact material 142 is made of rubber, for example, of which coefficient of friction with a document is large.

The retard roller 114 is arranged to face the sheet feeding roller 113, and restricts so that a document that does not contact the sheet feeding roller 113 is not conveyed in the conveyance direction A3. The retard roller 114 is supported by the main body unit of the image reading apparatus 100 in a rotation-free manner. Provided in an outer circumferential surface of the retard roller 114 is a contact material 143 that contacts a document placed on the document tray 103. The contact material 143 is made of rubber, for example, of which coefficient of friction with a document is large.

The ultrasonic wave transmitter 115a and the ultrasonic wave receiver 115b are arranged near the document conveyance path so as to sandwich the conveyance path and face each other. The ultrasonic wave transmitter 115a transmits an ultrasonic wave. On the other hand, the ultrasonic wave receiver 115b detects an ultrasonic wave that has been transmitted by the ultrasonic wave transmitter 115a and has penetrated a document, and generates and outputs an ultrasonic wave signal that is an electrical signal depending on the detected ultrasonic wave. In the following, the ultrasonic wave transmitter 115a and the ultrasonic wave receiver 115b may be collectively referred to as an ultrasonic sensor 115.

The first conveyance roller 116 and the first driven roller 117 are respectively supported by the main body unit of the image reading apparatus 100 in a rotation-free manner. The first conveyance roller 116 and the first driven roller 117 are arranged on the upstream side of the first imaging unit 130a and the second imaging unit 130b. The first driven roller 117 is arranged above the first conveyance roller 116 to face the first conveyance roller 116. The first conveyance roller 116 is fixed, and the first driven roller 117 is arranged so as to be movable upward (in the direction of the arrow A4) relative to the first conveyance roller 116.

The second conveyance roller 140 and the second driven roller 141 are respectively supported by the main body unit of the image reading apparatus 100 in a rotation-free manner. The second conveyance roller 140 and the second driven roller 141 are arranged on the downstream side of an imaging unit 130. The second driven roller 141 is arranged above the second conveyance roller 140 to face the second conveyance roller 140. The second conveyance roller 140 is fixed, and the second driven roller 141 is arranged so as to be movable upward (in the direction of the arrow A5) relative to the second conveyance roller 140.

Figure 4:
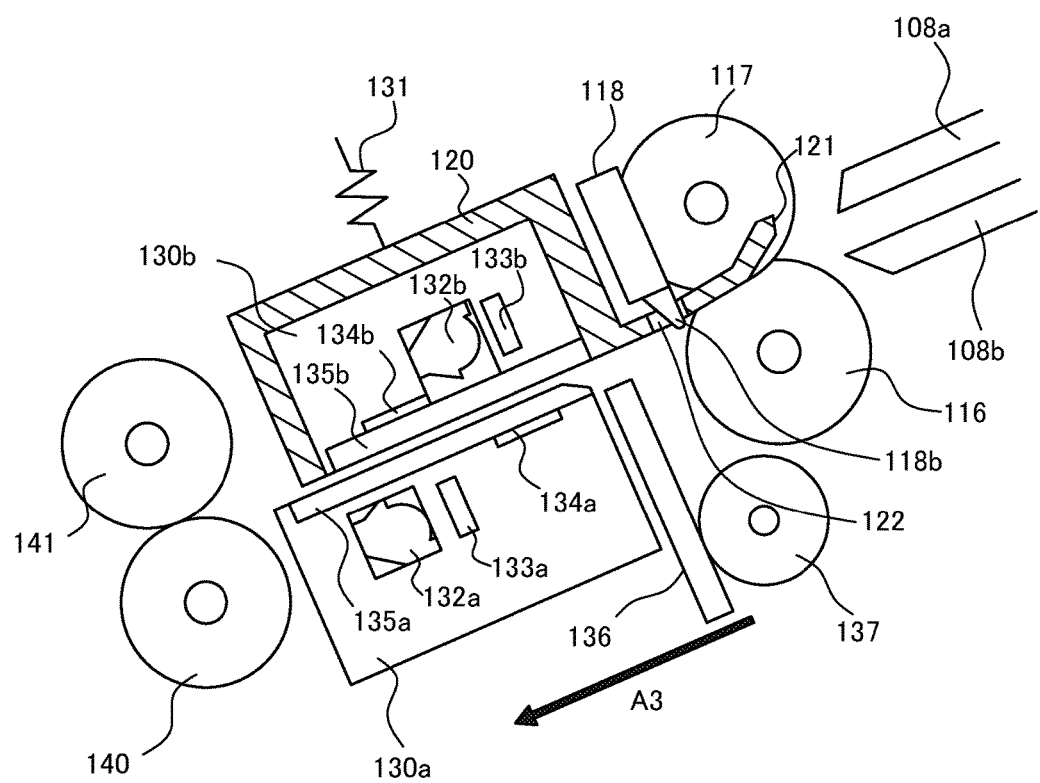
FIG. 4 is a diagram illustrating a first image capturing unit 130*a* etc.

FIG. 4 illustrates the first imaging unit 130a, the second imaging unit 130b, and the imaging unit guide 120. The first imaging unit 130a is an example of a first unit, the second imaging unit 130b is an example of a second unit, and the imaging unit guide 120 is an example of a guide. The first imaging unit 130a captures an image of a front surface of a conveyed document, and the second imaging unit 130b captures an image of a back surface of the conveyed document. The second imaging unit 130b is arranged above the first imaging unit 130a to face the first imaging unit 130a. The second imaging unit 130b includes the imaging unit guide 120 for guiding (leading) a document between the first imaging unit 130a and the second imaging unit 130b. In the following, the first imaging unit 130a and the second imaging unit 130b may be collectively referred to as the imaging unit 130.

The first imaging unit 130a is fixed to the lower housing 101. On the other hand, the second imaging unit 130b is supported by the upper housing 102 so as to be movable in the direction perpendicular to the conveyance path. The second imaging unit 130b includes a pushing spring 131 at an upper position thereof. The pushing spring 131 pushes the second imaging unit 130b toward the first imaging unit 130a. When there is no document at the conveyance path, pushing force of the pushing spring 131 returns the second imaging unit 130b back to an initial position. In other words, the second imaging unit 130b is provided to be able to move between an initial position facing the first imaging unit 130a and a position facing the first imaging unit 130a and more separated from the first imaging unit 130a than the initial position. The initial position of the second image capturing unit 130b will sometimes be referred to as a first position, and a position distant from the first image capturing unit 130a will sometimes be referred to as a second position hereinafter.

When the second imaging unit 130b is at the first position, a width of a gap between the first imaging unit 130a and the second imaging unit 130b facing each other is larger than the thicknesses of a copy paper sheet, a print paper sheet and a photo paper sheet, etc. For this reason, the second imaging unit 130b does not move from the initial position after any of these sheets are conveyed.

The first imaging unit 130a includes a first light source 132a, a first image capturing device 133a, a first reference member 134a and a first glass surface 135a, etc. The second imaging unit 130b includes a second light source 132b, a second image capturing device 133b, a second reference member 134b and a second glass surface 135b, etc. In the following, the first image capturing device 133a and the second image capturing device 133b may be collectively referred to as an image capturing device 133. The first reference member 134a and the second reference member 134b may be collectively referred to as a reference member 134.

The first light source 132a includes light emitting diodes (LEDs) of respective colors RGB and a light guiding material, and emits an illuminating light to a document surface. When there is no document at an illuminating position, the second reference member 134b of the second imaging unit 130b is irradiated with illuminating light. Similarly, the second light source 132b includes LEDs of respective colors RGB and a light guiding material, and emits an illuminating light to a document surface. When there is no document at an illuminating position, the first reference member 134a of the first imaging unit 130a is irradiated with illuminating light.

The first image capturing device 133a and the second image capturing device 133b are an example of an image capturing module. The first image capturing device 133a includes a contact image sensor (CIS) that is a unit-magnification optical system that includes an imaging element constituted by charge coupled devices (CCDs) that are linearly arranged in a main scanning direction. The first image capturing device 133a reads a front surface of the document guided by the imaging unit guide 120, captures images of the document, and generates and outputs an image signal. The second image capturing device 133b includes a CIS that is a unit-magnification optical system that includes an imaging element constituted by CCDs that are linearly arranged in a main scanning direction. The second image capturing device 133b reads a back surface of the document guided by the imaging unit guide 120, captures images of the documents, and generates and outputs the image signal. Alternatively, instead of the CCDs, complementary metal oxide semiconductors (CMOSs) may be used. Further, alternatively, instead of the CIS, an image sensor that is an optical reduction system can be used.

The first reference member 134a is a white reference plate, and is arranged at a position facing the second image capturing device 133b. When a document is not conveyed to the imaging unit 130, the second image capturing device 133b captures an image of the first reference member 134a to generate an image signal. Similarly, the second reference member 134b is arranged at a position facing the first image capturing device 133a of the first imaging unit 130a. When a document is not conveyed to the imaging unit 130, the first image capturing device 133a captures an image of the second reference member 134b to generate an image signal. On the basis of the image signals generated by capturing the images of the first reference member 134a and the second reference member 134b, the image reading apparatus 100 can perform image correction such as shading, etc.

The guide member 121 for guiding (leading) the document between the first imaging unit 130a and the second imaging unit 130b is provided to the imaging unit guide 120. The guide member 121 is an example of a conveyance mechanism and documents are guided and conveyed between the first imaging unit 130a and the second imaging unit 130b such that the leading edge of the document contacts with a surface of the first imaging unit 130a. The second sensor 118 is provided above the guide member 121. A lever portion 118b of the second sensor 118 penetrates a penetration hole 122 provided in the guide member 121 to contact a document on the conveyance path.

Either the first imaging unit 130a or the second imaging unit 130b may be omitted. In this case, in place of the omitted imaging unit, a transfer roller functioning as the reference member may be provided.

An arm 136 is accommodated in the lower housing 101 to face the imaging unit guide 120 across the document transfer path. The arm 136 is placed at the central position of the document transfer path in a direction (main scanning direction) perpendicular to the document transfer direction. Placing the arm 136 at the central position in the direction perpendicular to the document transfer direction allows stable movement of the second imaging unit 130b even with only one member. When a document exists in the document transfer path, the arm 136 may be placed at one or two ends of the document transfer path in the direction perpendicular to the document transfer direction not to come into contact with the document. The arm 136 engages with a gear 137.

Figure 5:
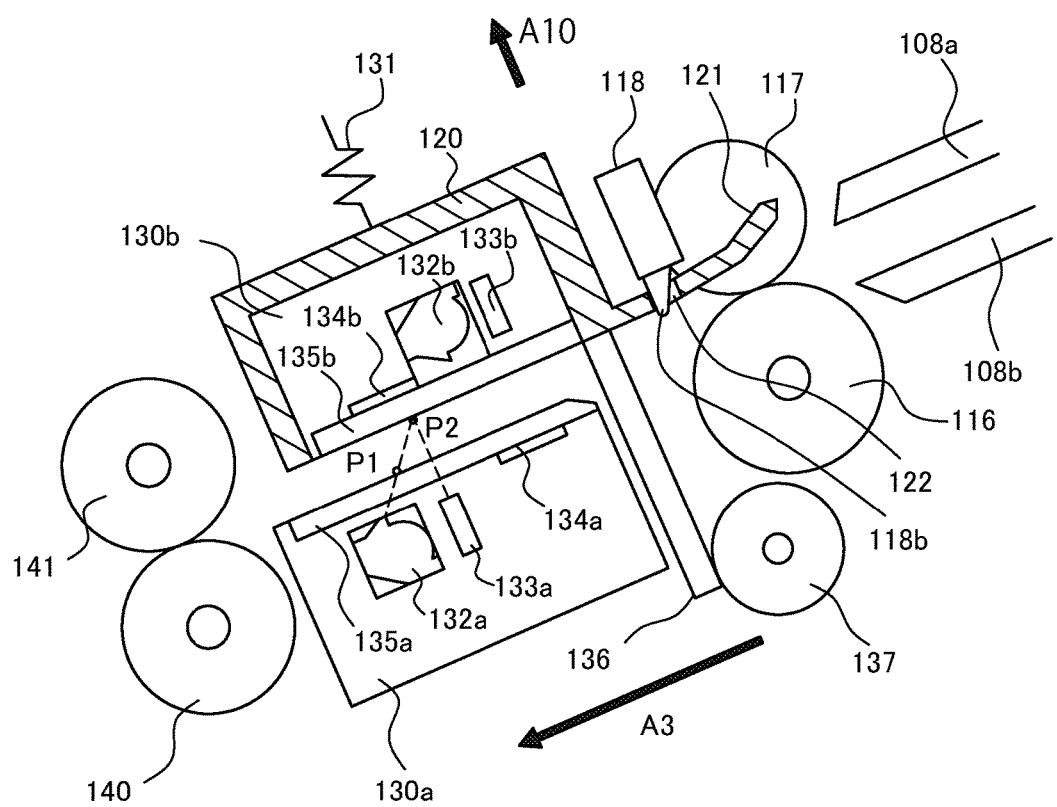
FIG. 5 is a diagram illustrating an operation of a second image capturing unit 130*b*.

FIG. 5 is a diagram illustrating an operation of the second imaging unit 130b during movement of the arm 136.

As illustrated in FIG. 5, when the gear 137 rotates by a motor, the arm 136 slides perpendicularly to the document transfer path upon rotation of the gear 137, comes into contact with the imaging unit guide 120, and pushes up the imaging unit guide 120 and the second imaging unit 130b to the second position. When the motor stops driving for the gear 137, the imaging unit guide 120 and the second imaging unit 130b restore to their initial position by the biasing force of the pushing spring 131. In other words, the motor moves the second imaging unit 130b between the first position and the second position.

Figure 6:
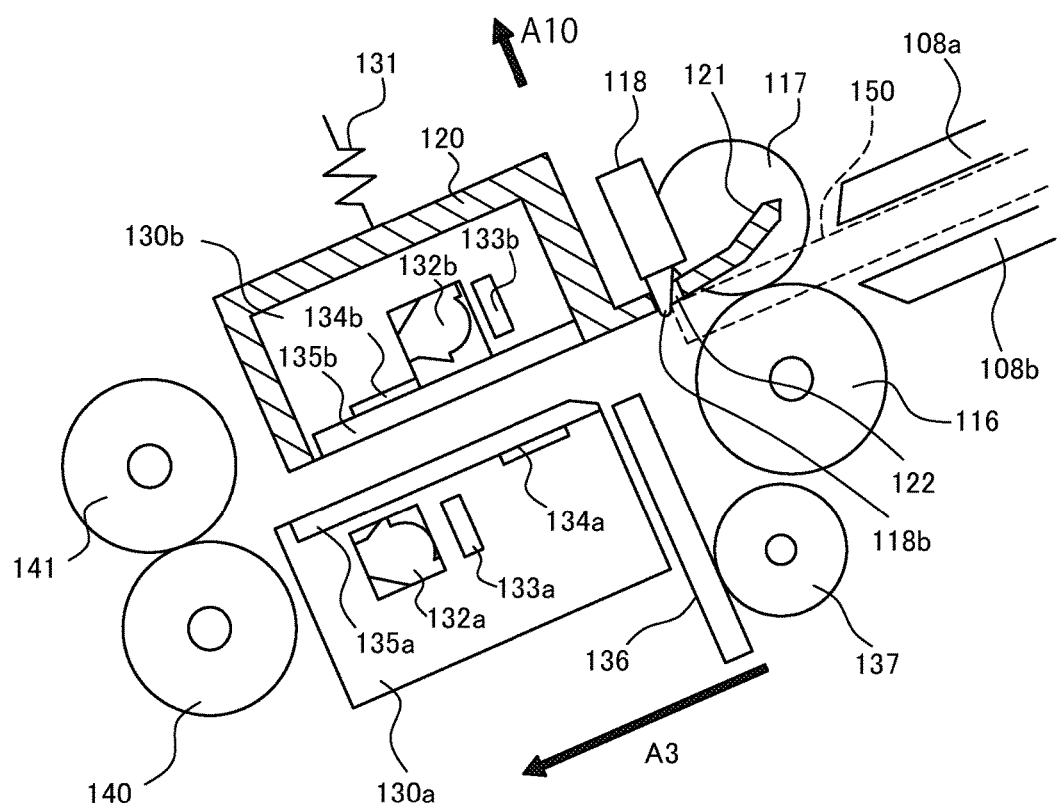
FIG. 6 is a diagram illustrating another operation of the second image capturing unit 130*b*.

FIG. 6 is a diagram illustrating an operation of the second imaging unit 130b at the timing of document transfer. An example illustrated in FIG. 6 assumes that a thick medium, such as cardboard, banking card, or credit card, thicker than copy paper, print paper, or photo paper is transferred as a document 150.

When a document 150 in the form of a thick medium is transferred to the position of the imaging unit guide 120, the document 150 having a certain strength comes into contact with a guide member 121. This moves the imaging unit guide 120 and the second imaging unit 130b in a direction away from the transfer path, as indicated by an arrow A10. In this manner, even when the motor that rotates the gear 137 is inactive, the second imaging unit 130b is provided to be movable by the document transferred to the image reading apparatus 100. In other words, the imaging unit guide 120 is provided such that the second imaging unit 130b moves depending on the document to be conveyed. In contrast to this, even when a document 150 in the form of a thin medium such as copy paper, print paper, or photo paper is transferred to the position of the imaging unit guide 120, the second imaging unit 130b remains still at the first position.

The document 150 in contact with the guide member 121 further comes into contact with the lever portion 118b of the second sensor 118 that passes through the penetration hole 122 of the guide member 121. As a result, the second sensor 118 detects that the document 150 exists at the position of the lever portion 118b. The second sensor 118 generates and outputs a second document detection signal having a first value when the lever portion 118b is not in contact with the document 150 and a second value when the lever portion 118b is in contact with the document 150.

The above-described embodied example is configured such that the second imaging unit 130b provided above the transfer path moves, but modification may be made such that the first imaging unit 130a provided below the transfer path moves.

Figure 7:
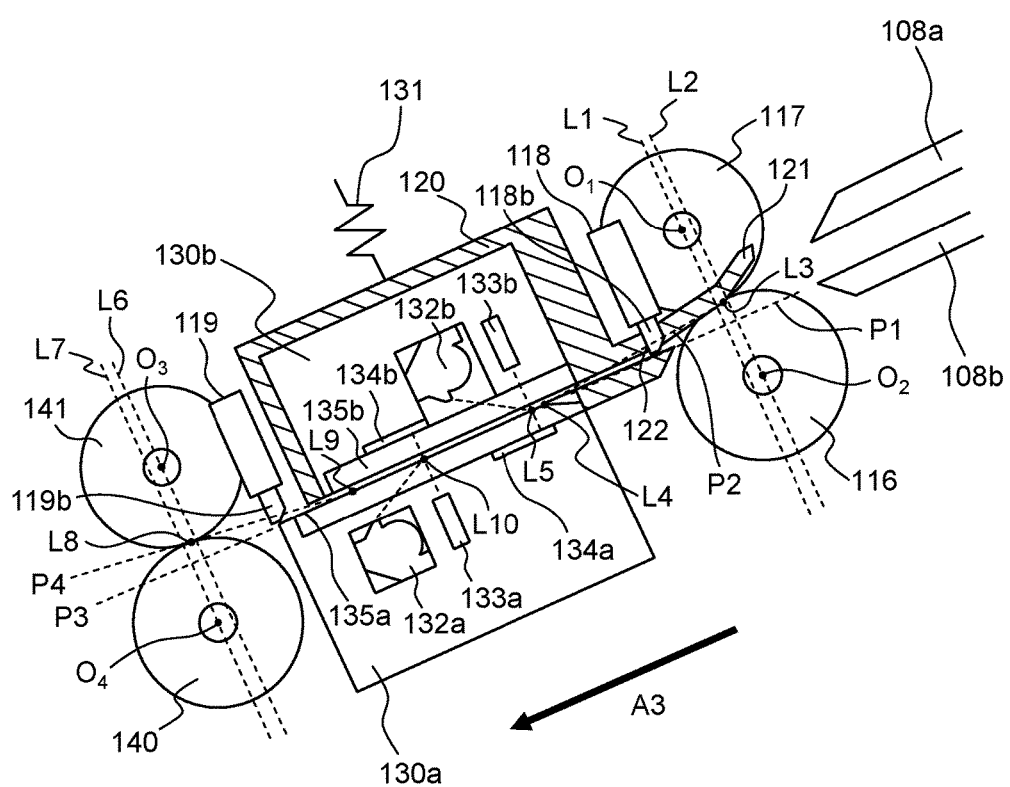
FIG. 7 is a drawing for explaining an imaging unit 130 etc.

FIG. 7 is a drawing for explaining the first imaging unit 130a, the second imaging unit 130b, and the imaging unit guide 120.

As illustrated in FIG. 7, a position L1 in a document conveying direction A3 of a center O1, i.e., a rotation axis of a first driven roller 117 is arranged to be shifted to the side of the imaging unit 130 than a position L2 in the document conveying direction A3 of a center O2, i.e., a rotation axis of a first conveyance roller 116. Further, nip positions L3 of the first conveyance roller 116 and the first driven roller 117 are arranged above an extended surface P1 in which a first glass surface 135a of the first imaging unit 130a is extended toward the first conveyance roller 116 and the first driven roller 117. Especially, in the nip positions L3, a position L4 where the tangential plane P2 contacting with the first conveyance roller 116 contacts with the first glass surface 135a is arranged such that position L4 is located on an upstream side of an image capturing position L5 of the second image capturing device 133b of the second imaging unit 130b in the document conveying direction A3.

A position L6 in the document conveying direction A3 of a center O3, i.e., the rotation axis of a second driven roller 141 is arranged to be shifted to the side of the imaging unit 130 than a position L7 in the document conveying direction A3 of a center O4, i.e., the rotation axis of a second conveyance roller 140. Nip positions L8 of the second conveyance roller 140 and the second driven roller 141 are arranged at the same height as the nip positions L3 with respect to the extended surface P3 in which the first glass surface 135a is extended toward the second conveyance roller 140 and the second driven roller 141. Especially, in the nip position L8, a position L9 where the tangential plane P4 contacting the second conveyance roller 140 contacts with the first glass surface 135a is arranged such that the position L9 is arranged to a downstream side in the document conveying direction A3 than an image capturing position L10 of the first image capturing device 133a. An angle of the tangential plane P4 with respect to the first glass surface 135a is preferably arranged to be the same as an angle of the tangential plane P2 with respect to the first glass surface 135a.

Figure 8A:
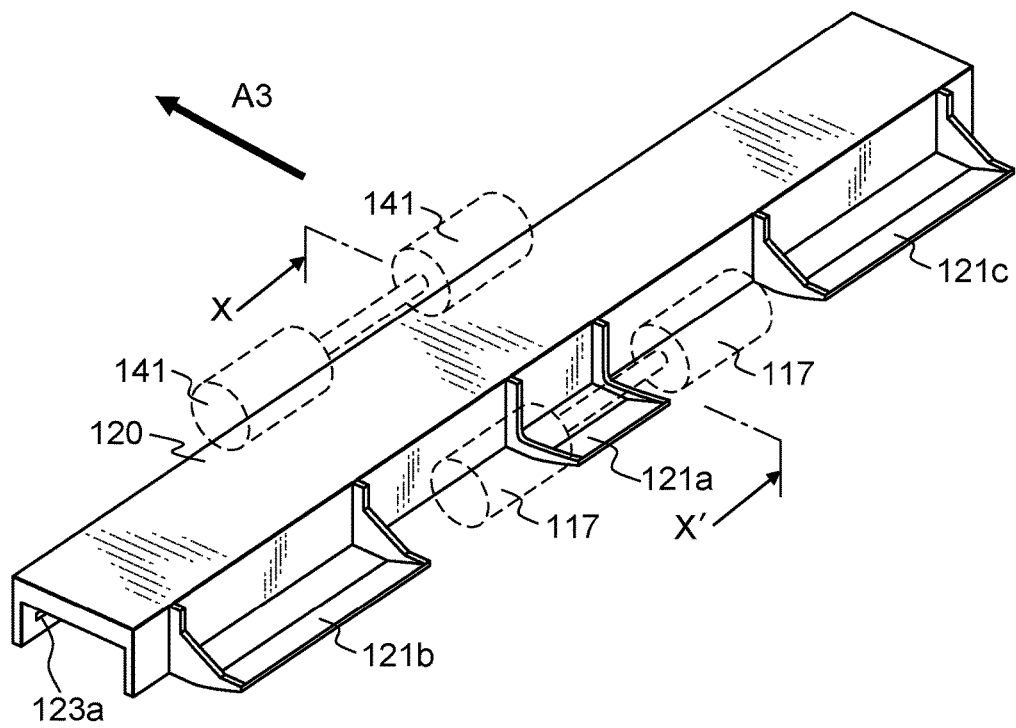
FIG. 8A is a perspective view of an imaging unit guide 120.
Figure 8B:
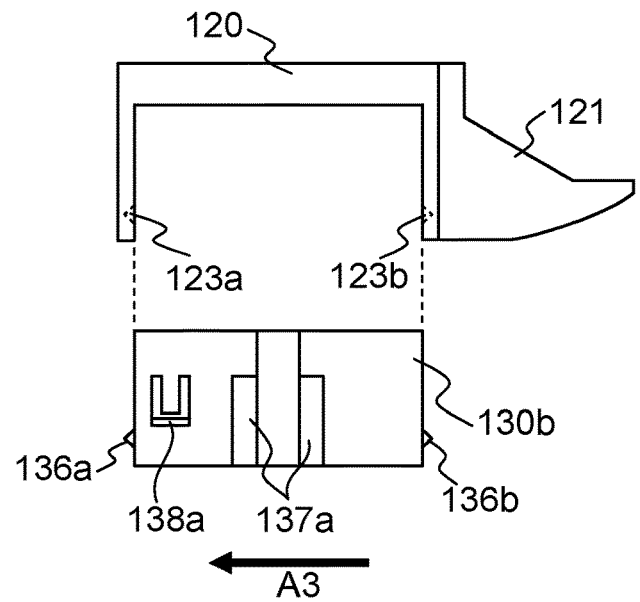
FIG. 8B is a side view of the imaging unit guide 120 etc.
Figure 8C:
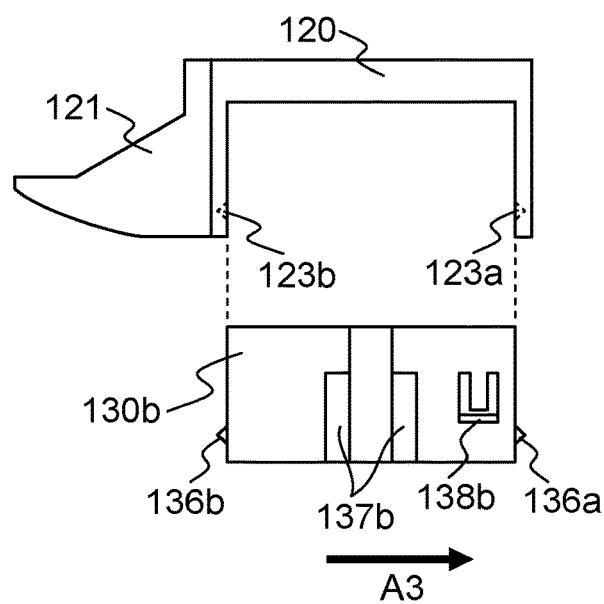
FIG. 8C is a side view of the imaging unit guide 120 etc.

FIG. 8A illustrates a perspective view of the imaging unit guide 120 and FIG. 8B and FIG. 8C illustrate side views of the imaging unit guide 120 and the second imaging unit 130b.

As illustrated in FIG. 8A, in the imaging unit guide 120, three guide members 121a, 121b, and 121c are provided in the direction orthogonal to the document conveying direction A3. The first driven roller 117 is arranged between each of the guide members 121a, 121b, and 121c. Each unit of an image reading apparatus 100 illustrated in FIG. 3 and FIG. 4 illustrates a view of the components of the guide member 121a of the imaging unit guide 120 taken along the arrow X-X' in FIG. 8A as viewed in the direction of the arrow X and X'.

As illustrated in FIG. 8B and FIG. 8C, the imaging unit guide 120 covers the second imaging unit 130b so that concave portions 123a and 123b provided to the imaging unit guide 120 are engaged with convex portions 136a and 136b provided in the second imaging unit 130b.

The second imaging unit 130b includes a first guide member 137a and a first locking member 138a on a side surface of one end side in the direction orthogonal to the document conveying direction A3 and includes a second guide member 137b and a second locking member 138b on a side surface of the other end side.

The first guide member 137a and the second guide member 137b engage with a rail portion (not illustrated) that is arranged inside the image reading apparatus 100 and extends in a substantially vertical direction with respect to the document conveying direction A3.

The first locking member 138a and the second locking member 138b engage with a locking portion (not illustrated) arranged in the image reading apparatus 100 so that the falling of the second imaging unit 130b is prevented.

Figure 9:
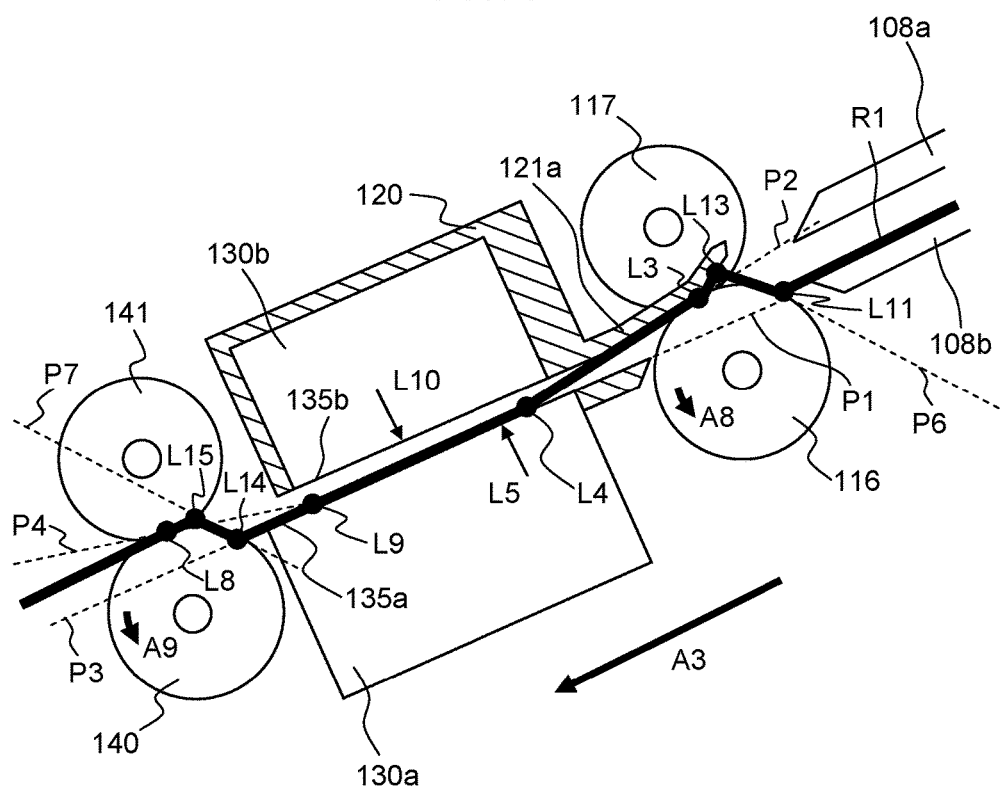
FIG. 9 is a drawing for explaining a state in which the document is conveyed.

FIG. 9 is a drawing for illustrating the state in which the document is conveyed.

FIG. 9 is a view of the components of the guide member 121a of the imaging unit guide 120 taken along the arrow X-X' in FIG. 8A as viewed in the direction of the arrow X and X' and a path R1 indicates a path through which ideally a leading edge of the document to be conveyed passes.

By rotating a paper feed roller 113 in a direction of an arrow A6 of FIG. 3, the document placed on a document tray 103 is conveyed between an upper guide 108a and a lower guide 108b in the document conveying direction A3. When the document is conveyed, a retard roller 114 rotates in a direction of an arrow A7 of FIG. 3. When documents are placed on the document tray 103, by the functions of the paper feed roller 113 and the retard roller 114, among the documents placed on the document tray 103, only the documents contacting with the paper feed roller 113 are separated. Consequently, the conveyance of the documents other than the separated document is restricted (prevention of multifeed).

The leading edge of the document guided by the lower guide 108b contacts the first conveyance roller 116 at the position L11 and is directed upward from the extended surface P1 of the first glass surface 135a along the tangential plane P6 of the first conveyance roller 116. Thereafter, a central portion of the leading edge of the document contacts with the guide member 121a of the imaging unit guide 120 at the position L13, at an edge, the leading edge contacts the guide member 121b and the guide member 121c and is directed downward.

The leading edge of the document that is directed downward by the guide members 121a, 121b and 121c is sent between the first conveyance roller 116 and the first driven roller 117. As the first conveyance roller 116 rotates in the direction of an arrow A8, the leading edge of the document passes through the nip positions L3 between the first conveyance roller 116 and the first driven roller 117. Then, the leading edge of the document advances along the tangential plane P2 at the nip positions L3 and at the position LA, contacts the first glass surface 135a of the first image capturing device 133a.

The document contacting with the first glass surface 135a is curved due to the low rigidity, and the leading edge of the document is conveyed along the first glass surface 135a. The leading edge of the document passes between the first imaging unit 130a and the second imaging unit 130b, then advances along the extended surface P3 of the first glass surface 135a, and at the position L14, contacts with the second conveyance roller 140. The leading edge of the document that contacts with the second conveyance roller 140 advances along a tangential plane P7 of the second conveyance roller 140 at the position L14 and at the position L15, contacts with the second driven roller 141.

The leading edge of the document that contacts with the second driven roller 141 is sent between the second conveyance roller 140 and the second driven roller 141. As the second conveyance roller 140 rotates in a direction of an arrow A9, the leading edge of the document passes through the nip position L8 between the second conveyance roller 140 and the second driven roller 141 and is discharged to a front cover 105a.

In this way, since the leading edge of the document is conveyed along the first glass surface 135a, the cleaning of the first glass surface 135a, i.e., the removal of the dust on the first glass surface 135a by the leading edge of the document becomes possible.

Depending on the width and the arrangement position etc., of the first conveyance roller 116, the first driven roller 117, and the guide members 121a to 121c, it is possible that the document to be conveyed bends in a main scanning direction and all of the leading edges of the documents do not always need to pass through the path R1. However, at least a part of the leading edge of the document passes through the path R1 in the main scanning direction, is crushed by the first glass surface 135a at the position L4, and as a result, most of the leading edge of the document contacts the first glass surface 135a of the document and cleans the first glass surface 135a. As a highly rigid document or the documents (especially, various kinds of documents) are conveyed, the region to be cleaned of the first glass surface 135a increases, and it is highly possible that an entire glass surface 135a is cleaned.

Figure 10:
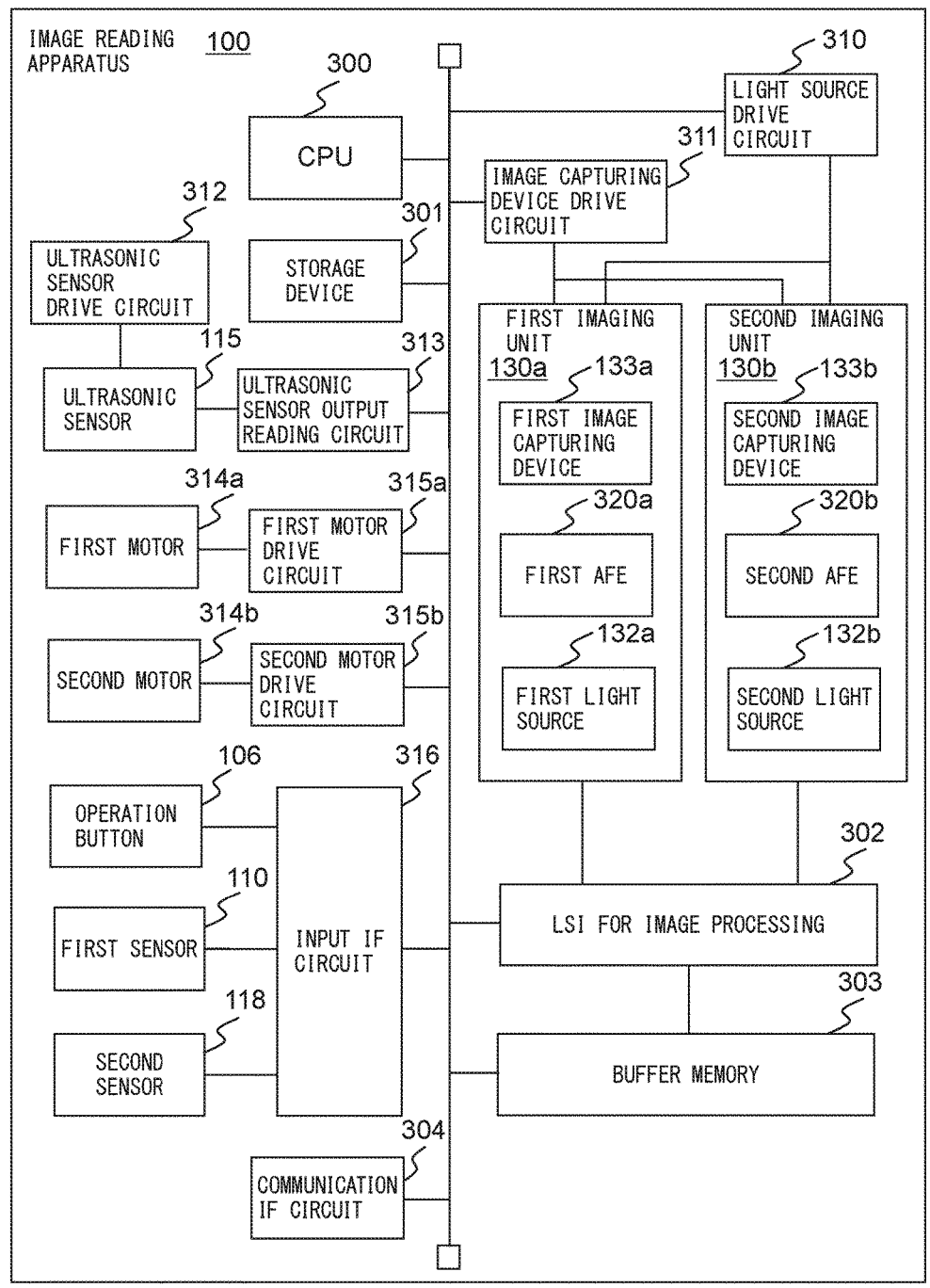
FIG. 10 is a diagram illustrating one example of a hardware configuration of the image reading apparatus 100.

FIG. 10 illustrates one example of a hardware configuration of the image reading apparatus 100. The image reading apparatus 100 includes a central processing unit (CPU) 300, a storage device 301, a large scale integration (LSI) 302 for image processing, a buffer memory 303, and a communication interface circuit 304 as well as the above-described configuration. In the attached drawings and the following description, an interface may be referred to as an IF.

Moreover, the image reading apparatus 100 includes a light source drive circuit 310, an image capturing device drive circuit 311, an ultrasonic sensor drive circuit 312, an ultrasonic sensor output reading circuit 313, a first motor 314a, a second motor 314b, a first motor drive circuit 315a, a second motor drive circuit 315b, and an input IF circuit 316. The first imaging unit 130a and the second imaging unit 130b include a first analogue front-end processor (AFE) 320a and a second AFE 320b, respectively.

The CPU 300 controls an operation of the image reading apparatus 100 in accordance with a computer program stored in the storage device 301. Furthermore, the CPU 300 may perform a part of or all of image processing for an image read by the image reading apparatus 100. Alternatively, a DSP (digital signal processor), an LSI (large scale integration), etc., may be used instead of the CPU 150. As another alternative, an ASIC (Application Specific Integrated Circuit), an FPGA (Field-Programming Gate Array), etc., may be used instead of the CPU 300.

The storage device 301 includes memory devices such as a RAM (Random Access Memory), a ROM (Read Only Memory), etc., a fixed disk device such as a hard disk, or a portable storage device such as a flexible disk, an optical disk, etc. The storage device 301 stores computer programs, databases, tables, etc., used for various kinds of processing of the image reading apparatus 100. The computer program may be installed on the storage device 301 from a computer-readable, non-transitory medium such as a compact disk read only memory (CD-ROM), a digital versatile disk read only memory (DVD-ROM), etc., by using a well-known setup program, etc. Further, the storage device 301 stores the read images.

The first AFE 320a and the second AFE 320b convert analogue image signals into digital signals to generate digital image data, the analogue image signals being output from the first image capturing device 133a of the first imaging unit 130a and the second image capturing device 133b of the second imaging unit 130b. The first AFE 320a and the second AFE 320b output the image data to the LSI 320 for image processing.

The LSI 302 for image processing performs predetermined image processing on the image data received from the imaging unit 130. The LSI 302 for image processing stores such image data in the buffer memory 303 as the image processing is performed. Alternatively, a DSP, an ASIC, or an FPGA, etc., may be used instead of the LSI 302 for image processing.

The communication IF circuit 304 is a wired or wireless communication interface between the image reading apparatus 100 and the information processing apparatus 10. The CPU 300 reads the image date from the buffer memory 303 to transmit the image data to the information processing apparatus 10 via the communication IF circuit 304.

The light source drive circuit 310 drives the first light source 132a of the first imaging unit 130a and the second light source 132b of the second imaging unit 130b in accordance with the control performed by the CPU 300. The image capturing device drive circuit 311 drives the first image capturing device 133a of the first imaging unit 130a and the second image capturing device 133b of the second imaging unit 130b in accordance with the control performed by the CPU 300.

The ultrasonic sensor drive circuit 312 drives the ultrasonic wave transmitter 115a to cause the ultrasonic wave to be transmitted. The ultrasonic sensor output reading circuit 313 reads an output signal of the ultrasonic wave receiver 115b to transmit the output signal to the CPU 300 via a bus.

The first motor 314a applies a rotational drive force to the sheet feeding roller 113, the retard roller 114, the first conveyance roller 116, and the second conveyance roller 140. A plurality of first motors 314a may be used. The first motor drive circuit 315a generates a drive current to be supplied to the first motor 314a under the control of the CPU 300. The second motor 314b is one example of a drive device and applies a rotational drive force to the gear 137. In other words, the second motor 314b is an example of a drive force generating device that may generate drive force for moving the second imaging unit 130b. The second motor drive circuit 315b generates a drive current to be supplied to the second motor 314b under the control of the CPU 300. By providing the second motor 314b separately from the first motor 314a, the image reading apparatus 100 can independently execute rotation control of each roller and movement control of the second imaging unit 130b via the gear 137 to simplify each type of processing.

The input IF circuit 316 receives an operation detection signal output by the operation button 106, a first document detection signal output by the first sensor 110, and a second document detection signal output by the second sensor 118 to transmit the signals to the CPU 300 via the bus.

The hardware configuration illustrated in FIG. 7 is merely an example for explanation of the embodied example. The image reading apparatus 100 may include any other hardware configurations as long as the operation described in the following may be performed.

Figure 11:
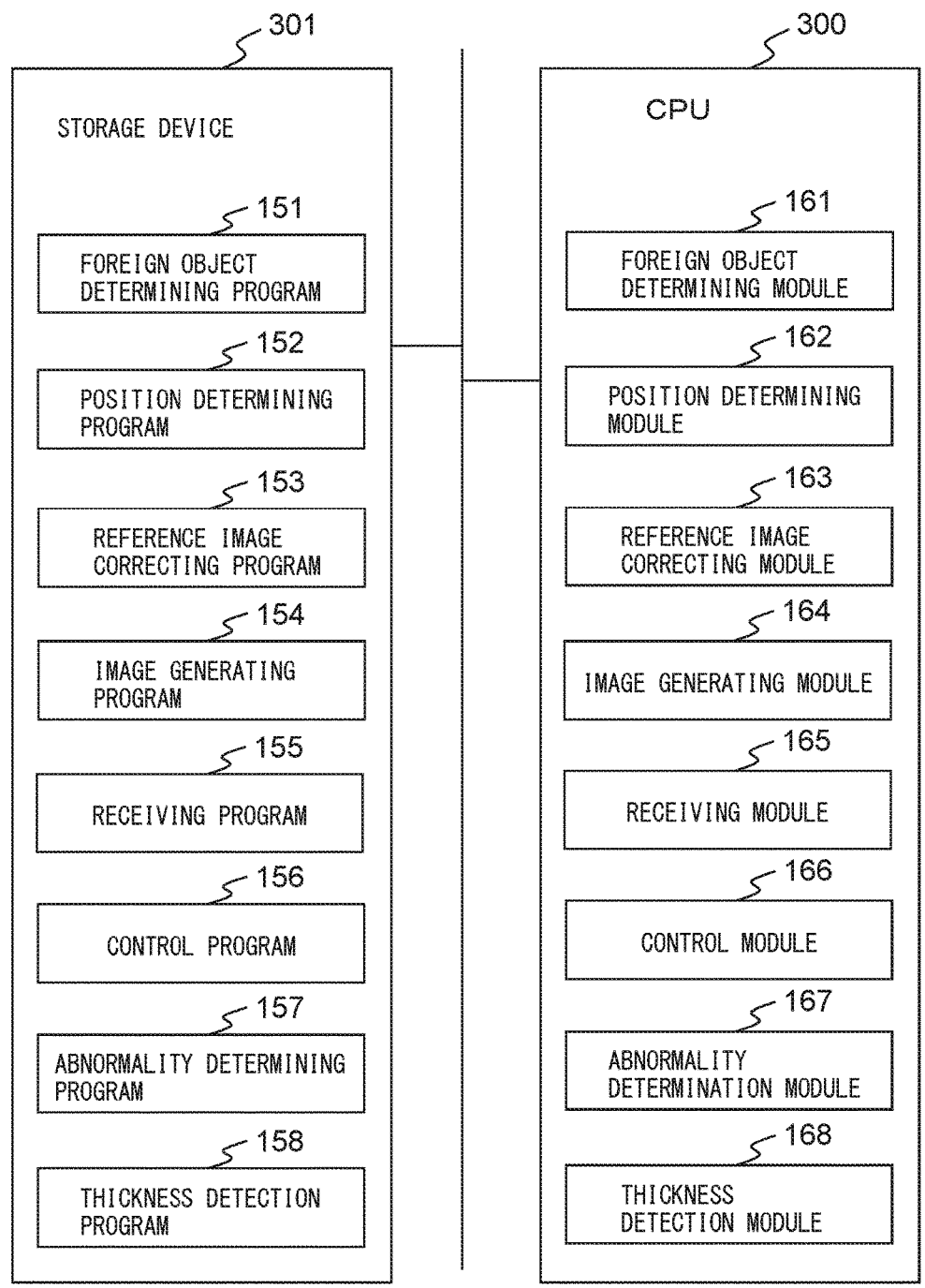
FIG. 11 is a diagram representing a schematic configuration of a storage device 301 and a CPU 300.

FIG. 11 is a diagram illustrating a schematic configuration of the storage device 301 and the CPU 300.

As illustrated in FIG. 11, a storage device 301 stores various programs such as a foreign object determining program 151, a position determining program 152, a reference image correcting program 153, an image generating program 154, a receiving program 155, a control program 156, an abnormality determining program 157 and a thickness detection program 158. Each of these programs is a functional module implemented by software running on a processor. The CPU 300 reads each program stored in the storage device 301 and operates based on each read program so as to function as a foreign object determining module 161, a position determining module 162, a reference image correcting module 163, an image generating module 164, a receiving module 165, a control module 166, an abnormality determination module 167 and a thickness detection module 168.

Figure 12:
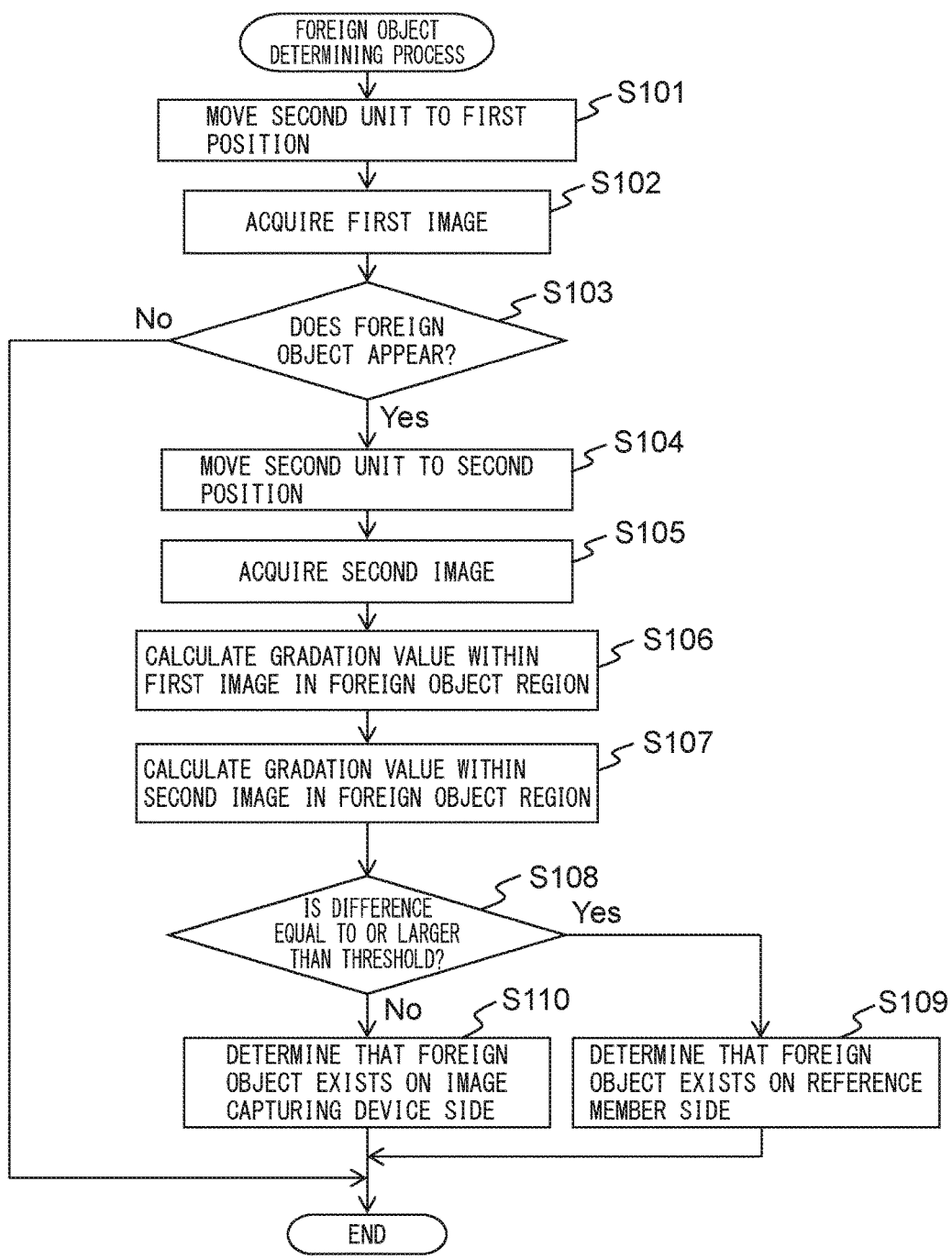
FIG. 12 is a flowchart representing an operational example of a foreign object determining process.

FIG. 12 is a flowchart representing an operational example of a foreign object determining process of the image reading apparatus 100.

Referring to the flowchart of FIG. 12, the following describes the operational example of the foreign object determining process of the image reading apparatus 100. The flow of the operation described below is performed mainly by the CPU 300 based on the programs previously stored in the storage device 301, cooperating with the respective elements of the image reading apparatus 100. The flow of the operation illustrated in FIG. 12 is performed, for example, at the timing of staring up the device, the timing of closing the opened front surface cover 105a, or the timing of starting communication connection with the information processing device 10. The flow of the operation illustrated in FIG. 12 may also be performed periodically or in accordance with an instruction from the user, at an arbitrary timing when the document reading process is not being performed.

First, the foreign object determining module 161 drives the second motor 314b via the second motor drive circuit 315b to move the second imaging unit 130b to the first position (step S101). When the second imaging unit 130b has already been set at the first position, the process in step S101 may be omitted.

Next, the foreign object determining module 161 drives the image capturing device drive circuit 311 and causes the first image capturing device 133a and the second image capturing device 133b to capture first images to acquire each first image (step S102). In other words, the first image captured by the first image capturing device 133a is an image of the second reference member 134b captured when the second imaging unit 130b is provided at the first position. The first image captured by the second image capturing device 133b is an image of the first reference member 134a captured when the second imaging unit 130b is provided at the first position.

Next, the foreign object determining module 161 determines whether a foreign object such as paper powder, dust, or paste appears in each of the first images captured by the first image capturing device 133a and the second image capturing device 133b (step S103). For each of all the pixels in the first images, for example, the foreign object determining module 161 determines whether or not the pixel has a gradation value within a predetermined range. When the pixel having gradation value outside the predetermined range exists, the foreign object determining module 161 determines that a foreign object appears in this pixel, i.e., a foreign object appears in the first image. On the other hand, when no pixels have a gradation value outside the predetermined range, the foreign object determining module 161 determines that no foreign objects appear in the first images.

A region where a foreign object appears in the image used by the foreign object determining module 161 for the determination, i.e., a region of pixels having gradation values outside the predetermined range is sometimes called a foreign object region in the following. The foreign object region is not limited to a region of pixels having gradation values outside the predetermined range, and may be a region whose center is a pixel (pixel whose gradation value is the peak value) having a gradation value most distant from the predetermined range and that is constituted by pixels within a predetermined distance from the pixel of this center. The predetermined range is determined, for example, to be a range that has a predetermined width (e.g., 10) and whose center is an average of gradation values of all the pixels included in the captured image of the second reference member 134b or the first reference member 134a in the foregoing experiment. Alternatively, the predetermined range may be determined to be a range that has a predetermined width and whose center is an average of gradation values of all the pixels included in the image used by the foreign object determining module 161 for the determination.

When no foreign object appears in the first images, the foreign object determining module 161 terminates a series of the steps.

When the foreign object appears in the first image, the position determining module 162 drives the second motor 314b via the second motor drive circuit 315b to move the second imaging unit 130b to the second position (step S104).

Next, the position determining module 162 drives the image capturing module drive circuit 311 to cause one or both of the first image capturing device 133a and the second image capturing device 133b to capture and acquire the second image (step S105). When a foreign object appears in the first image captured by the first image capturing device 133a, the position determining module 162 causes the first image capturing device 133a to capture the second image. When a foreign object appears in the first image captured by the second image capturing device 133b, the position determining module 162 causes the second image capturing device 133b to capture the second image. The second image captured by the first image capturing device 133a is an image of the second reference member 134b captured when the second imaging unit 130b is provided at the second position. The second image captured by the second image capturing device 133b is an image of the first reference member 134a captured when the second imaging unit 130b is provided at the second position.

The positions of the second imaging unit 130b corresponding to the first image and the second image are not limited to the above-mentioned example, and an image captured when the second imaging unit 130b is provided at the second position may be defined as a first image, and an image captured when the second imaging unit 130b is provided at the first position may be defined as a second image.

Next, the position determining module 162 calculates a gradation value in the foreign object region within the first image (step S106). The position determining module 162 calculates, for example, the average of gradation values for respective pixels included in the foreign object region within the first image. The gradation value calculated by the position determining module 162 may be any representative value of gradation values in the first image, and may be a median, for example.

Next, the position determining module 162 calculates a gradation value of a region included in the second image and corresponding to the foreign object region (step S107). For example, the position determining module 162 calculates an average of gradation values of respective pixels included in the captured second image and positioned at the same coordinates as respective coordinates in the foreign object region in the reference image. The gradation value calculated by the position determining module 162 may be any representative value of gradation values in the second image, and may be a median, for example.

Next, the position determining module 162 determines whether or not an absolute value of a difference between the calculated gradation value in the foreign object region within the first image and the gradation value of the region corresponding to the foreign object region within the second image is equal to or larger than a threshold (step S108). The predetermined threshold is determined, for example by foregoing experiment, to be an average of two averages, one of the two average being an average of an absolute value of a difference between the gradation values calculated when a foreign object is attached to the first glass surface 135a, the other of the two average being an average of an absolute value of a difference between the gradation values calculated when a foreign object is attached to the second glass surface 135b.

When the absolute value of the difference between the respective gradation values is equal to or larger than the predetermined threshold, the position determining module 162 determines that the foreign object exists on the image capturing device side (step S109), and terminates a series of the steps. When the foreign object exists in the first image captured by the first image capturing device 133a, the position determining module 162 determines that the foreign object exists on the second image capturing device 133b side, i.e., on the second glass surface 135b of the second imaging unit 130b. On the other hand, when the foreign object exists in the first image captured by the second image capturing device 133b, the position determining module 162 determines that the foreign object exists on the first image capturing device 133a side, i.e., on the first glass surface 135a of the first imaging unit 130a.

On the other hand, when the absolute value of the difference between the respective gradation values is smaller than the predetermined threshold, the position determining module 162 determines that the foreign object exists on the reference member side (step S110), and terminates a series of the steps. When the foreign object exists in the first image captured by the first image capturing device 133a, the position determining module 162 determines that the foreign object exists on the first reference member 134a side, i.e., on the first glass surface 135a of the first imaging unit 130a. On the other hand, when the foreign object exists in the first image captured by the second image capturing device 133b, the position determining module 162 determines that the foreign object exists on the second reference member 134b side, i.e., on the second glass surface 135b of the second imaging unit 130b.

At the step S108, the position determining module 162 determines whether or not the absolute value of the difference between the respective gradation values is equal to or larger than the predetermined threshold, for each of a red component, a green component, and a blue component in the first image and the second image. When the absolute value of the difference is equal to or larger than the predetermined threshold for any one of the components, the position determining module 162 determines that the foreign object exists on the image capturing device side, and when the absolute value of the difference is smaller than the predetermined threshold for all of the components, the position determining module 162 determines that the foreign object exists on the reference member side. When the absolute value of the difference is equal to or larger than the predetermined threshold for all of the components, the position determining module 162 may determine that the foreign object exists on the reference member side, and when the absolute value of the difference is smaller than the predetermined threshold for any one of the components, the position determining module 162 may determine that the foreign object exists on the image capturing device side.

The receiving module 165 receives via the input IF circuit 316 the setting that has been set by a user via the operation button 106 and that indicates which of a single color and a plurality of colors is used to capture an image of a document. When the receiving module 165 receives the setting that indicates that a plurality of colors is used to capture an image of a document, the position determining module 162 determines whether or not the absolute value of the difference between the gradation values is equal to or larger than the predetermined threshold, for each of the red component, the green component, and the blue component. On the other hand, when the receiving module 165 receives the setting that indicates that a single color is used to capture an image of a document, the position determining module 162 may determine whether or not the absolute value of the difference between the gradation values is equal to or larger than the predetermined threshold, for one of the red component, the green component, or the blue component. In this case, when the absolute value of the difference between the gradation values is equal to or larger than the predetermined threshold for the one color component, the position determining module 162 determines that the foreign object exists on the reference member side, and when the absolute value of the difference is smaller than the predetermined threshold, the position determining module 162 determines that the foreign object exists on the image capturing device side. With these processes, a position where the foreign object exists can be accurately determined, and a process load can be reduced when a single color is used to capture an image of a document.

At steps S101 and S104, instead of the foreign object determining module 161, the control module 166 may drive the second motor 314b and move the second imaging unit 130b. As described above, the control module 166 causes the second motor 314b to generate the drive force for moving the second imaging unit 130b when the document is not conveyed such as when the apparatus is started, when the front cover 105a in the opened state is closed, and at the start of the communication connection with the information processing apparatus 10.

In this manner, the position determining module 162 determines whether a position of the foreign object is on the image capturing device side or on the reference member side, based on the absolute value of the difference between the gradation value of the region within the first image and the gradation value of the region corresponding to the foreign object region within the second image.

The following describes the reason why comparing gradation values of two images of the reference member captured at different distances between the image capturing device and the reference member enables determination of whether a foreign object exists on the image capturing device side or on the reference member side.

FIGS. 13A to 13D are graphs expressing first images and second images.

In FIGS. 13A to 13D, the horizontal axes indicate horizontal coordinates of each image, and the vertical axes indicate gradation values. The first images and second images to be described with reference to FIGS. 13A to 13D are horizontal one-line images. Since a foreign object appears in the same manner in an image captured by either one of the first image capturing device 133a or the second image capturing device 133b, the images captured by the first image capturing device 133a are expressed as representatives in FIGS. 13A to 13D.

Figure 13A:
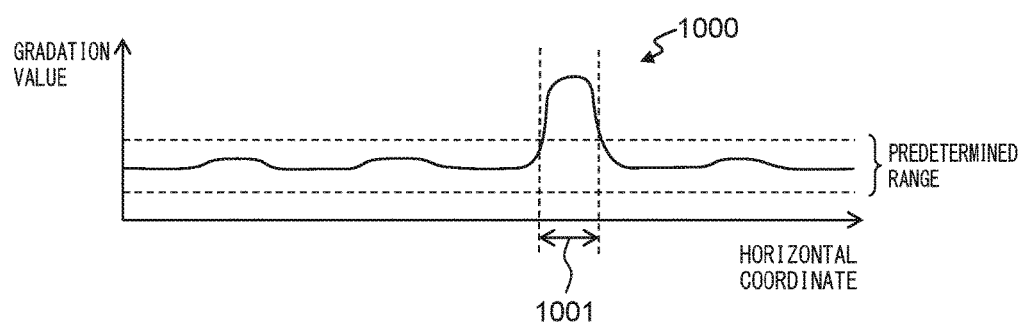
FIG. 13A is a graph expressing a first image.

A graph 1000 in FIG. 13A indicates one example of a first image when a foreign object is attached to the second glass surface 135b of the second imaging unit 130b. As illustrated in FIG. 13A, since the second reference member 134b appears in each pixel where the foreign object does not appear within the first image, the change in gradation value is small, and each gradation value stays within a predetermined range. In a foreign object region 1001 where the foreign object appears, the change in gradation value is large, and each gradation value deviates from the predetermined range.

Figure 13B:
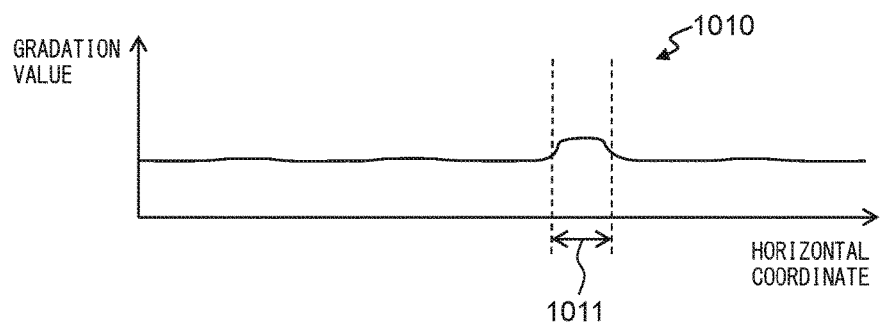
FIG. 13B is a graph expressing a second image.

A graph 1010 in FIG. 13B indicates one example of a second image when a foreign object is attached to the second glass surface 135b of the second imaging unit 130b. In this case, the second imaging unit 130b moves to the second position so that the foreign object attached to the second glass surface 135b moves away from the first image capturing device 133a. Therefore, the foreign object blurs in the second image, and the gradation value of a region 1011 included corresponding to the foreign object region 1001 within the second image is considerably different from the gradation value in the foreign object region 1001 within the first image.

Figure 13C:
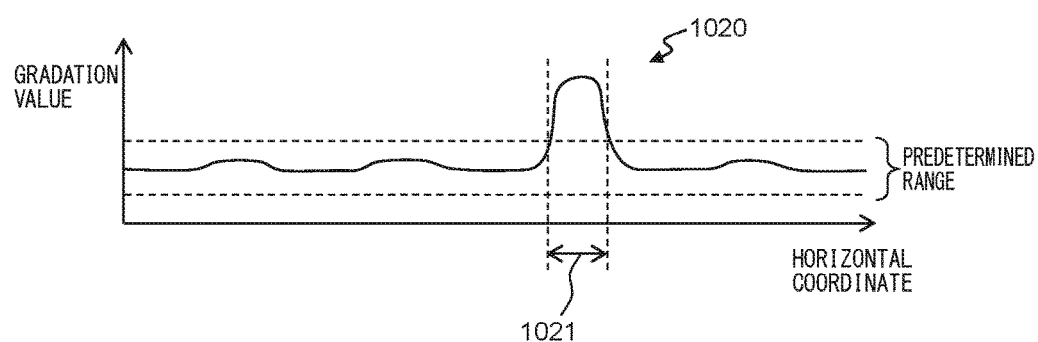
FIG. 13C is a graph expressing a first image.

A graph 1020 in FIG. 13C indicates one example of a first image when a foreign object is attached to the first glass surface 135a of the first imaging unit 130a. In the first image illustrated in FIG. 13C, as well as the first image illustrated in FIG. 13A, in a foreign object region 1021 where the foreign object appears, the change in gradation value is large, and each gradation value deviates from the predetermined range.

Figure 13D:
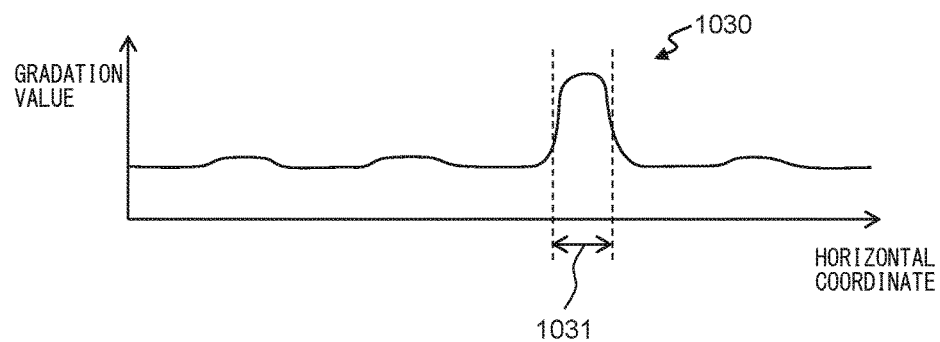
FIG. 13D is a graph expressing a second image.

A graph 1030 in FIG. 13D indicates one example of a second image when a foreign object is attached to the first glass surface 135a of the first imaging unit 130a. In this case, the second imaging unit 130b moves to the second position, but the distance between the first image capturing device 133a and the foreign object attached to the first glass surface 135a remains the same. Therefore, the gradation value of a region 1031 corresponding to the foreign object region 1021 within the second image varies less than the gradation value in the foreign object region 1021 within the first image.

Thus, the position determining module 162 can determine whether the foreign object exists on the image capturing device side or on the reference member side with high accuracy, by comparing gradation values in the foreign object region within the first image, with gradation values in the region corresponding to the foreign object region within the second image.

Figure 14:
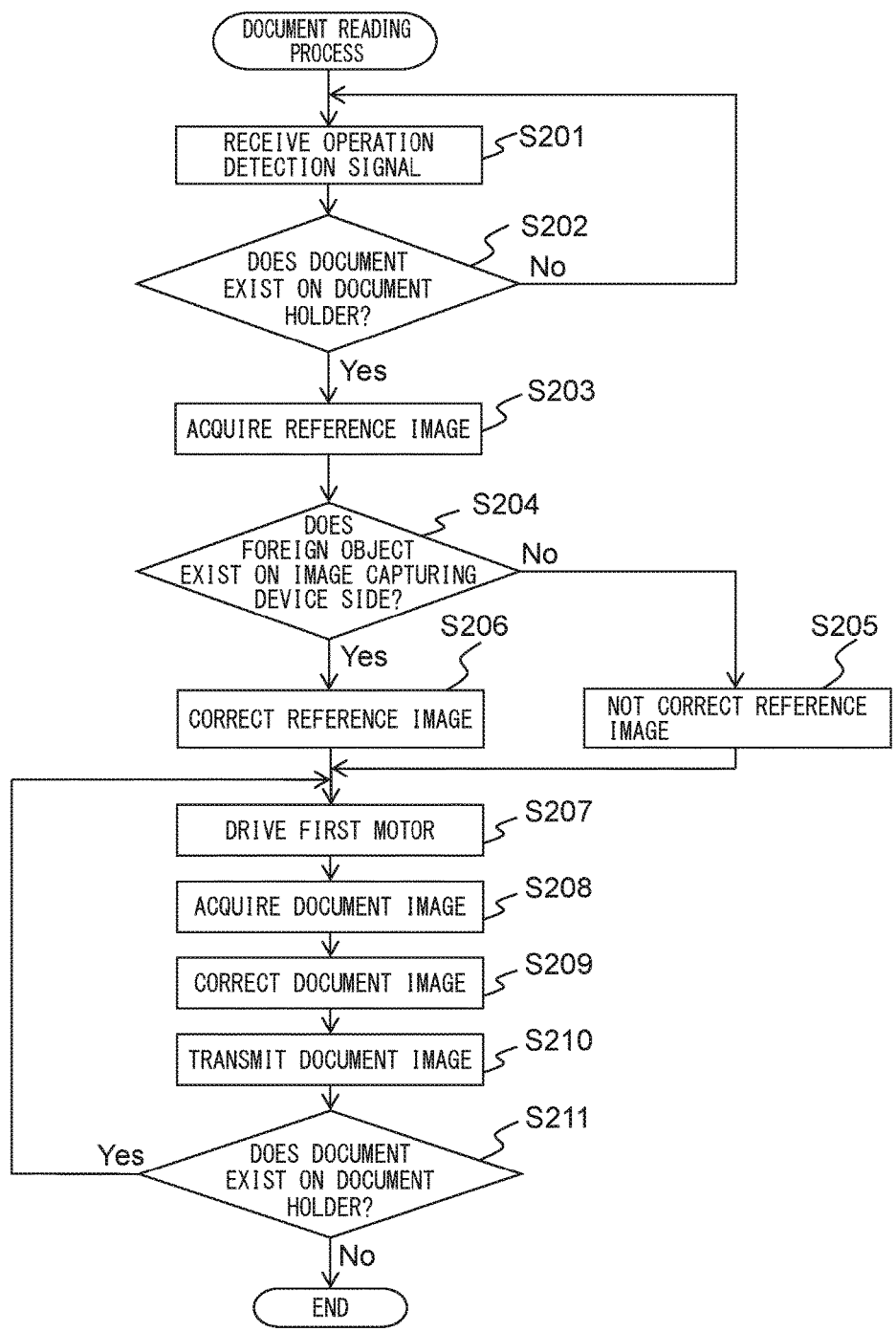
FIG. 14 is a flowchart representing an operational example of a document reading process.

FIG. 14 is a flowchart representing an operational example of a document reading process of the image reading apparatus 100.

Referring to the flowchart of FIG. 14, the following describes the operational example of the document reading process of the image reading apparatus 100. The flow of the operation described below is performed mainly by the CPU 300 based on the programs previously stored in the storage device 301, cooperating with the respective elements of the image reading apparatus 100.

First, the CPU 300 waits until a user presses down the operation button 106 for commanding reading of a document, and the CPU 300 receives from the operation button 106 an operation detection signal that commands reading of a document (step S201).

Next, the CPU 300 determines whether or not a document is placed on the document tray 103, based on a first document detection signal received from the first sensor 110 (step S202).

When a document is not placed on the document tray 103, the CPU 300 returns the process to the step S201, and waits until the CPU 300 receives the operation detection signal from the operation button 106 again.

When a document is mounted on the document tray 103, the reference image correcting module 163 causes the first image capturing device 133a and the second image capturing device 133b to capture reference images of the second reference member 134b and the first reference member 134a, respectively. The reference image correcting module 163 acquires the reference images from the first image capturing device 133a and the second image capturing device 133b via the first AFE 320a and the second AFE 320b (step S203). These reference images are used to correct a document image acquired by capturing an image of the document.

The reference image correcting module 163 determines whether a foreign object has been determined to exist on either one of the sides of the first image capturing device 133a or the second image capturing device 133b in the foreign object determining process (step S204).

When no foreign object exists, or when a foreign object exists, but it is on the side of an image capturing device, the reference image correcting module 163 does not correct the reference image captured by the image capturing device (step S205). When the foreign object exists on the image capturing device side, there is a high possibility that the foreign object appears at a position corresponding to the foreign object region in both of the reference image captured by this image capturing device and a document image subsequently captured. Thus, performing the shading correction using the reference image where the foreign object appears at the position corresponding to the foreign object region as it is enables removal of the foreign object appearing in the document image, and suppression of vertical stripe noise generation in the document image caused by the foreign object.

When a foreign object exists, and it is on the side of a reference member facing an image capturing device, the reference image correcting module 163 corrects the reference image captured by the image capturing device (step S206). The reference image correcting module 163 corrects the reference image by, for example, replacing each of gradation values of respective pixels included in the foreign object region within the reference image, with an average of gradation values of respective pixels included in a region neighboring this foreign object region and having a predetermined width. When the foreign object exists on the reference member side facing the image capturing device, there is a high possibility that the foreign object appears in the reference image captured by this image capturing device and at the position corresponding to the foreign object region. However, since a document exists between this image capturing device and the foreign object at the time of next capturing of a document image, there is a high possibility that the foreign object does not appear in the document image. Thus, the shading correction is performed using the reference image from which the foreign object has been removed. Thereby, the document image can be appropriately corrected.

When the position determining module 162 determines in step S108 whether the absolute value of the difference between the respective gradation values is equal to or larger than a threshold for each of red, green, and blue components, the reference image correcting module 163 may correct the reference image for each color component. In this case, the reference image correcting module 163 corrects only a color component for which the absolute value of the difference between the respective gradation values is determined to be equal to or larger than the threshold in the reference image. With this operation, the reference image correcting module 163 can correct only a component affected by the foreign object in the reference image and therefore perform shading correction more appropriately.

Next, the image generating module 164 drives the first motor 314a via the first motor drive circuit 315a, to rotate the sheet feeding roller 113, the retard roller 114, the first conveyance roller 116, and the second conveyance roller 140 and to transfer a document (step S207).

The image generating module 164 causes the first image capturing device 133a and the second image capturing device 133b to capture respective surfaces of the transferred document to acquire document images. The reference image correcting module 163 then receives the document images from the first image capturing device 133a and the second image capturing device 133b via the first AFE 320a and the second AFE 320b (step S208).

Next, the image generating module 164 executes shading correction on the respective document images, using the respective reference images (step S209).

Next, the image generating module 164 transmits the corrected document images to the information processing device 10 via the communication IF circuit 304 (step S210).

Next, the CPU 300 determines whether a document still exists on the document tray 103, based on a first document detection signal received from the first sensor 110 (step S211).

When the document still exists on the document tray 103, the CPU 300 returns the process to the step S207, and repeats the processes of the steps S207 to S211. The CPU 300 may return the process to step S203, in which it may acquire another reference image every time one document is transferred. On the other hand, when a document does not exist on the document tray 103, the CPU 300 terminates a series of the processes.

As described above in detail, by operating based on the flowcharts illustrated in FIG. 12 and FIG. 14, the image reading apparatus 100 may forcibly move the second imaging unit 130b provided so as to be moved by the document to be conveyed at the appropriate timing. The image reading apparatus 100 determines an existing position of a foreign object by comparing gradation values of two captured images of the reference member at different distances between the image capturing device and the reference member. Thus, the image reading apparatus 100 can accurately determine the existing position of the foreign object. This enables the image reading apparatus 100 to appropriately determine whether or not to correct the reference image used in the shading correction, and enables the image reading apparatus 100 to generate an appropriate reference image. Therefore, the image reading apparatus 100 can suppress generation of vertical stripe noise in a document image caused by a foreign object.

Second Embodiment

Figure 15:
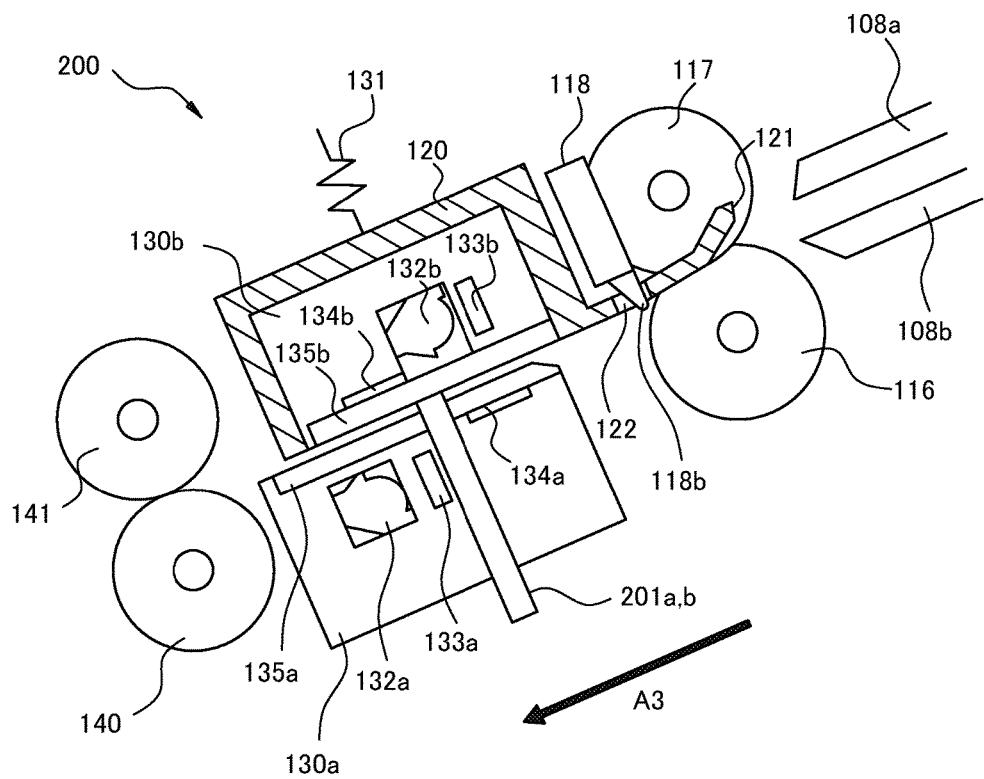
FIG. 15 is a drawing for explaining the imaging unit 130 according to the second embodiment.
Figure 16:
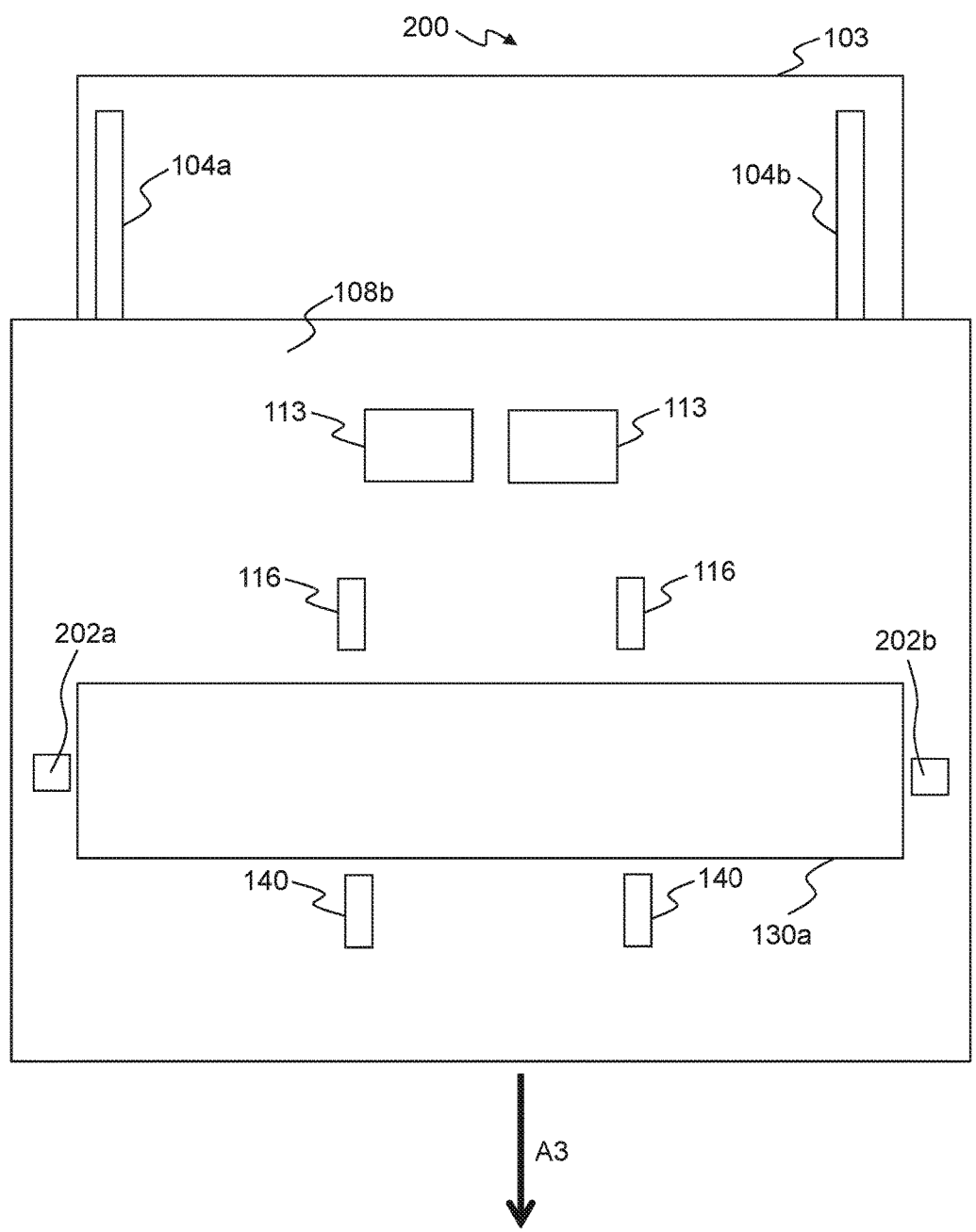
FIG. 16 is a drawing of an image reading apparatus 200 as viewed from above.
Figure 17:
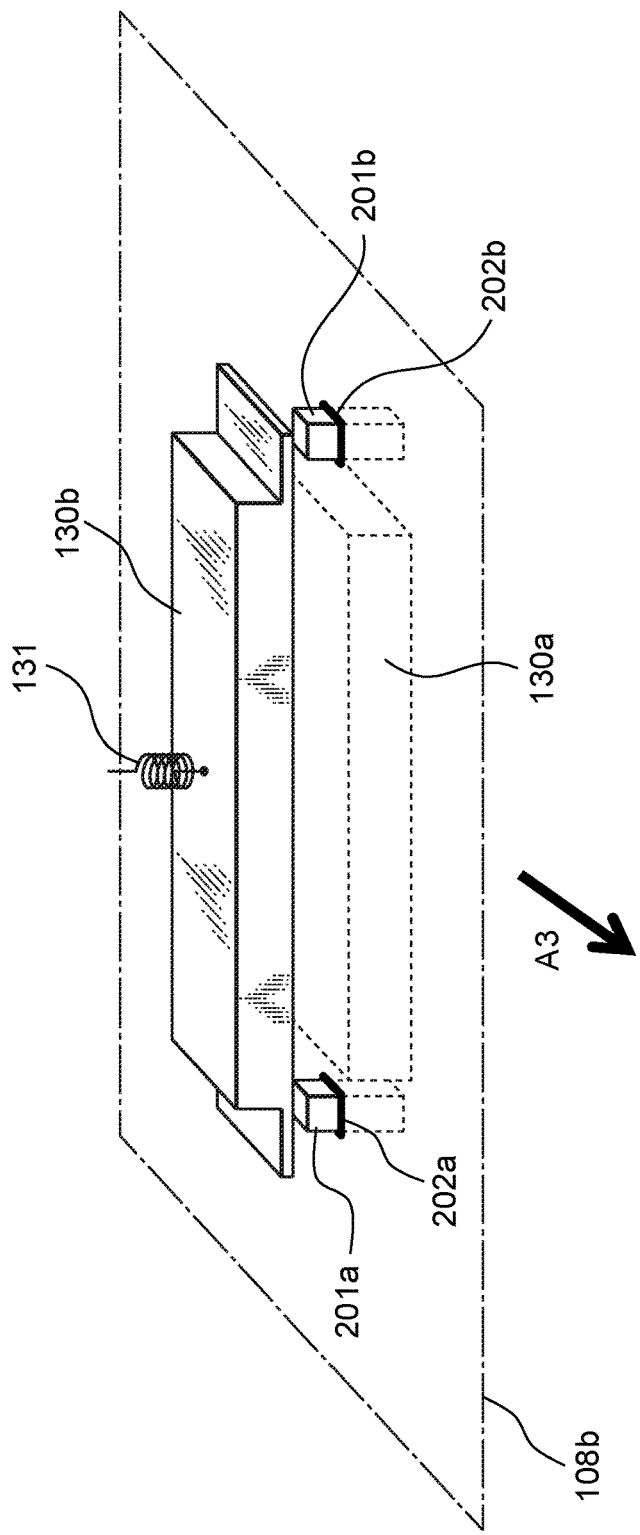
FIG. 17 is a perspective view of the imaging unit 130.

FIG. 15 is a drawing for explaining the imaging unit 130 of the image reading apparatus 200 according to the second embodiment. FIG. 16 is a view of the image reading apparatus 200 as viewed from the above with an upper housing 102 removed. FIG. 17 is a perspective view of the imaging unit 130.

As illustrated in FIG. 15 and FIG. 17, in the image reading apparatus 200, inside a lower housing 101, two arms 201a and 201b are provided at a position outside of the both ends of the first imaging unit 130a in the direction orthogonal to the document conveying direction A3 of the first imaging unit 130a. Each of the arms 201a and 201b is provided at a position facing both ends in the direction orthogonal to the document conveying direction A3 of the second imaging unit 130b across a document conveyance path.

As illustrated in FIG. 16 and FIG. 17, in the lower guide 108b, penetration holes 202a and 202b through which the respective arms 201a and 201b pass are provided at a position outside of the both ends of the first imaging unit 130a in the direction orthogonal to the document conveying direction A3 of the first imaging unit 130a. The respective arms 201a and 201b slide in the vertical direction with respect to the document conveyance path via the respective penetration holes 202a and 202b provided to the lower guide 108b, contact with the second imaging unit 130b, and cause the second imaging unit 130b to be moved. Hereinafter, the arms 201a and 201b may be generally referred to as arms 201.

Figure 18A:
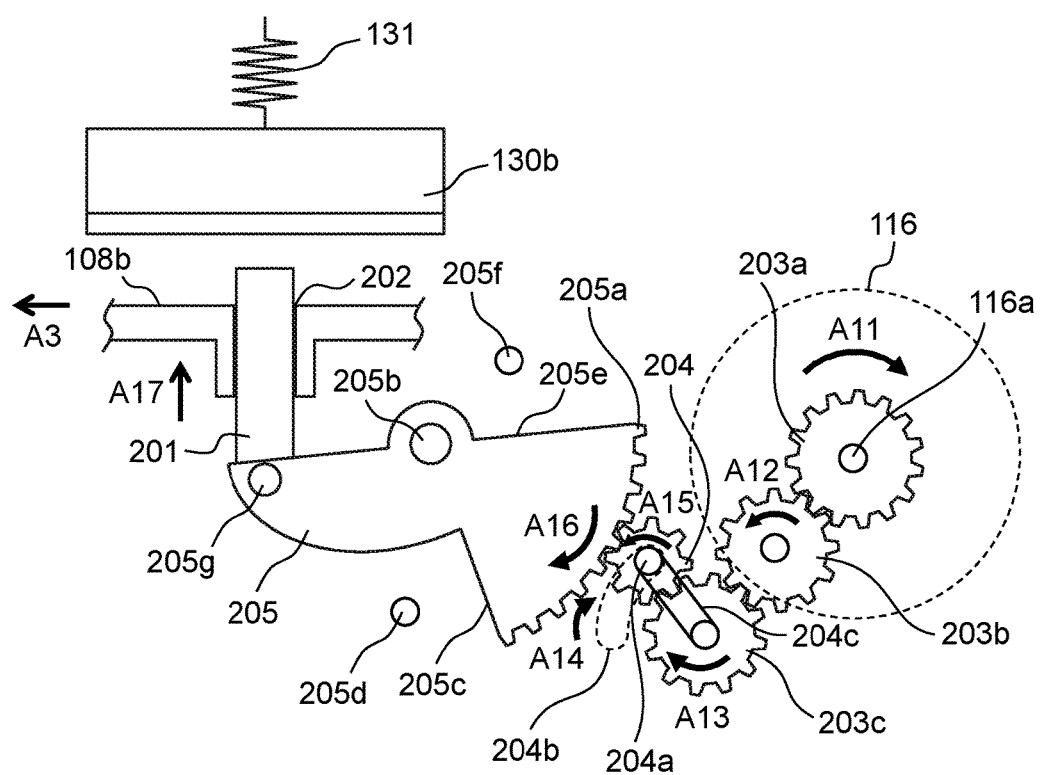
FIG. 18A is a drawing for explaining a drive mechanism of the image reading apparatus 200.
Figure 18B:
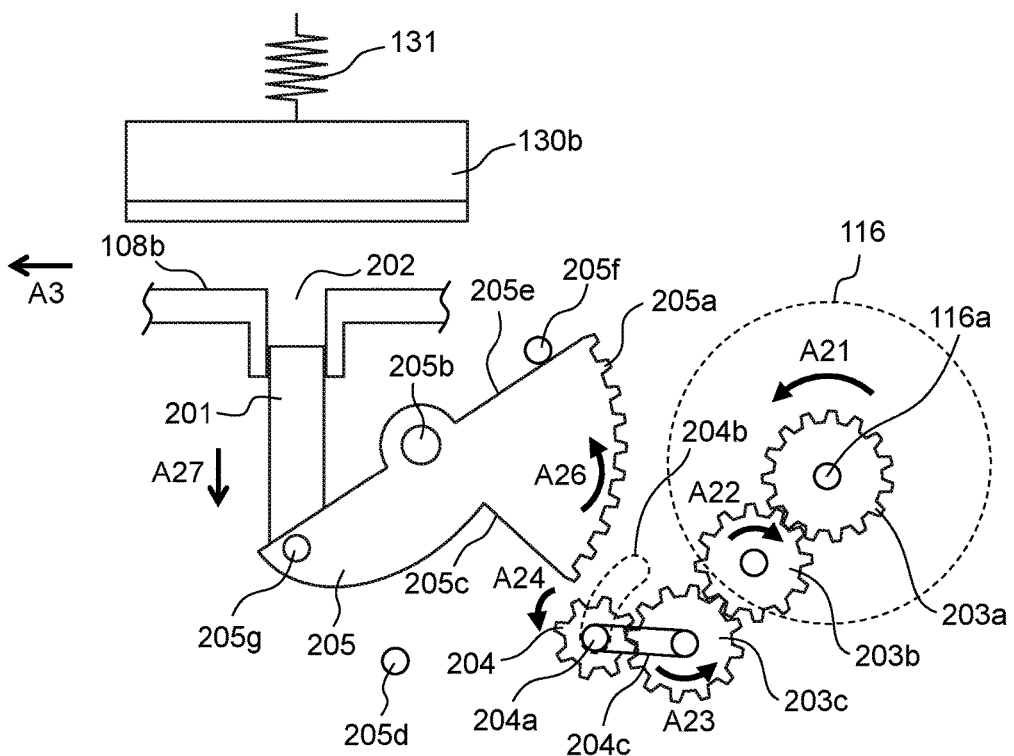
FIG. 18B is a drawing for explaining the drive mechanism of the image reading apparatus 200.

FIG. 18A and FIG. 18B are drawings for explaining the drive mechanism of the image reading apparatus 200.

As illustrated in FIG. 18A and FIG. 18B, in addition to the above described arms 201, the drive mechanism of the image reading apparatus 200 includes first to third gears 203a to 203c, a planet gear 204, a cam 205 etc. The arms 201, the first to third gears 203a to 203c, the planet gear 204, and the cam 205 are one example of a drive force transmitter.

In the present embodiment, a first motor 314a applies the drive force to the paper feed roller 113 and the retard roller 114 and the second motor 314b applies the drive force to the first conveyance roller 116, the second conveyance roller 140, and the gear 137.

A belt is stretched between the rotation axis of the second motor 314b and the rotation axis 116a of the first conveyance roller 116 (not illustrated) such that the first conveyance roller 116 rotates based on the rotation of the rotation axis of the second motor 314b. A first gear 203a is attached to the rotation axis 116a of the first conveyance roller 116. The first gear 203a is engaged with a second gear 203b, the second gear 203b is engaged with a third gear 203c, and the third gear 203c is engaged with the planet gear 204.

The rotation axis 204a of the planet gear 204 is movably arranged along a groove 204b provided to an unillustrated case where the first to third gears 203a to 203c and the planet gear 204 are arranged. The rotation axis 204a of the planet gear 204 is supported by a supporting member 204c such as belt so as to be connected to the rotation axis of the third gear 203c. Accordingly, the planet gear 204 moves (revolves) along the groove 204b based on the rotation of the third gear 203c. The planet gear 204 is engaged with the cam 205 at the upper right position of the groove 204b and the planet gear 204 is not engaged with the cam 205 at the left bottom end position of the groove 204b.

The cam 205 includes a gear portion 205a, a rotation axis 205b, a first contact portion 205c, a first fixing member 205d, a second contact portion 205e, a second fixing member 205f, a hinge 205g etc. When the planet gear 204 is positioned at the upper right side position of the groove 204b, the gear portion 205a is engaged with the planet gear 204. The cam 205 is provided so as to be rotatable around the rotation axis 205b between a position where the first contact portion 205c contacts with the first fixing member 205d and a position where the second contact portion 205e contacts with the second fixing member 205f. The hinge 205g is provided to one end of the cam 205 and the lower end of the arms 201 is attached to the hinge 205g.

In this way, the drive force transmitter (arms 201, first to third gears 203a to 203c, planet gear 204, and cam 205) is arranged between the second motor 314b, and the second imaging unit 130b and the first conveyance roller 116.

The operation of the drive mechanism of the image reading apparatus 100 is described below.

The second motor 314b generates first drive force by a rotation in a first direction and generates second drive force by the rotation in the second direction opposite to the first direction. The rotation in the first direction is a rotation in which the rotation axis 116a of the first conveyance roller 116 is rotated in a direction of an arrow A11 of FIG. 18A and the rotation in the second direction is a rotation in which the rotation axis 116a of the first conveyance roller 116 is rotated in a direction of an arrow A21 in FIG. 18B (reverse direction of arrow A11).

When the second motor 314b generates the first drive force, the rotation axis 116a of the first conveyance roller 116 rotates in the direction of the arrow A11, and the first conveyance roller 116 rotates in a direction opposite to the direction in which the document is conveyed. Along with this, the first gear 203a attached to the rotation axis 116a also rotates in the direction of the arrow A11 and the second gear 203b and the third gear 203c respectively rotate in the directions of the arrows A12 and A13.

The planet gear 204 engaged with the third gear 203c, based on the rotation of the third gear 203c, moves (revolves) in the direction of the arrow A14 toward the upper right end side of the groove 204b along the groove 204b and is engaged with the gear portion 205a of the cam 205. Further, the planet gear 204, based on the rotation of the third gear 203*c*, rotates (autorotates) in a direction of the arrow A15 at the upper right end position of the groove 204*b*.

Based on the rotation of the planet gear 204, the cam 205 rotates in a direction of an arrow A16 and the arms 201 attached to the cam 205 moves upward in a direction of an arrow A17 (state illustrated in FIG. 17 and FIG. 18A). The raised arms 201 contact with the second imaging unit 130*b* and move the second imaging unit 130*b* away from the first imaging unit 130*a*. Thereafter, when the first contact portion 205*c* of the cam 205 contacts with the first fixing member 205*d*, the cam 205 and the arms 201 stop and the second imaging unit 130*b* stops at a second position.

In this way, each drive force transmitter transmits the first drive force by the second motor 314*b* to the second imaging unit 130*b* via the planet gear 204 and moves the second imaging unit 130*b*.

On the other hand, when the second motor 314*b* generates the second drive force, the rotation axis 116*a* of the first conveyance roller 116 rotates in the direction of an arrow A21 in FIG. 18B and the first conveyance roller 116 rotates in the direction in which the document is conveyed. The first gear 203*a* attached to the rotation axis 116*a* rotates in the direction of an arrow A21 and the second gear 203*b* and the third gear 203*c* respectively rotate in the directions of the arrows A22 and A23.

The planet gear 204 engaged with the third gear 203*c*, based on the rotation of the third gear 203*c*, moves (revolves) in the direction of the arrow A24 of the groove 204*b* along the groove 204*b*. Along with this, the cam 205 rotates in the direction of the arrow A26 and the arms 201 descend in the direction of the arrow A27. The second imaging unit 130*b* remote from the descended arms 201 descends in the direction of the arrow A27 and, by the urging force of an pushing spring 131, stops at the first position. When the planet gear 204 moves to the left bottom end position of the groove 204*b*, the planet gear 204 does not engage with the gear portion 205*a* of the cam 205 (state illustrated in FIG. 18B). Consequently, the second drive force is not transmitted to the cam 205, the arms 201, and the second imaging unit 130*b*, and the arms 201 descend in the direction of the arrow A27 due to its own weight. As the arms 201 descend, the cam 205 further rotates in a direction of an arrow A26 and when the second contact portion 205*e* of the cam 205 contacts with the second fixing member 205*f*, the cam 205 and the arms 201 stop.

In this way, in response to switching from the first drive force to the second drive force by the second motor 314*b*, each drive force transmitter transmits the second drive force to the first conveyance roller 116 and conveys the document. As the connection of the planet gear 204 is changed in response to the switching from the first drive force to the second drive force by the second motor 314*b*, each drive force transmitter interrupts the transmission of the second drive force to the second imaging unit 130*b*. At this time, the second imaging unit 130*b* is moved depending on the document to be conveyed.

The second conveyance roller 140 is connected to the second motor 314*b* via an unillustrated drive mechanism (drive force transmitter) and is controlled to rotate similarly to the first conveyance roller 116.

As described in detail above, in the second embodiment also, the image reading apparatus 200 may forcibly move the second imaging unit 130*b* provided so as to be moved by the document to be conveyed at the appropriate timing. Further, since the image reading apparatus 200 can drive the second imaging unit 130*b*, the first conveyance roller, and the second conveyance roller by one motor, it is possible to achieve the cost reduction and the lower power consumption.

Third Embodiment

Figure 19:
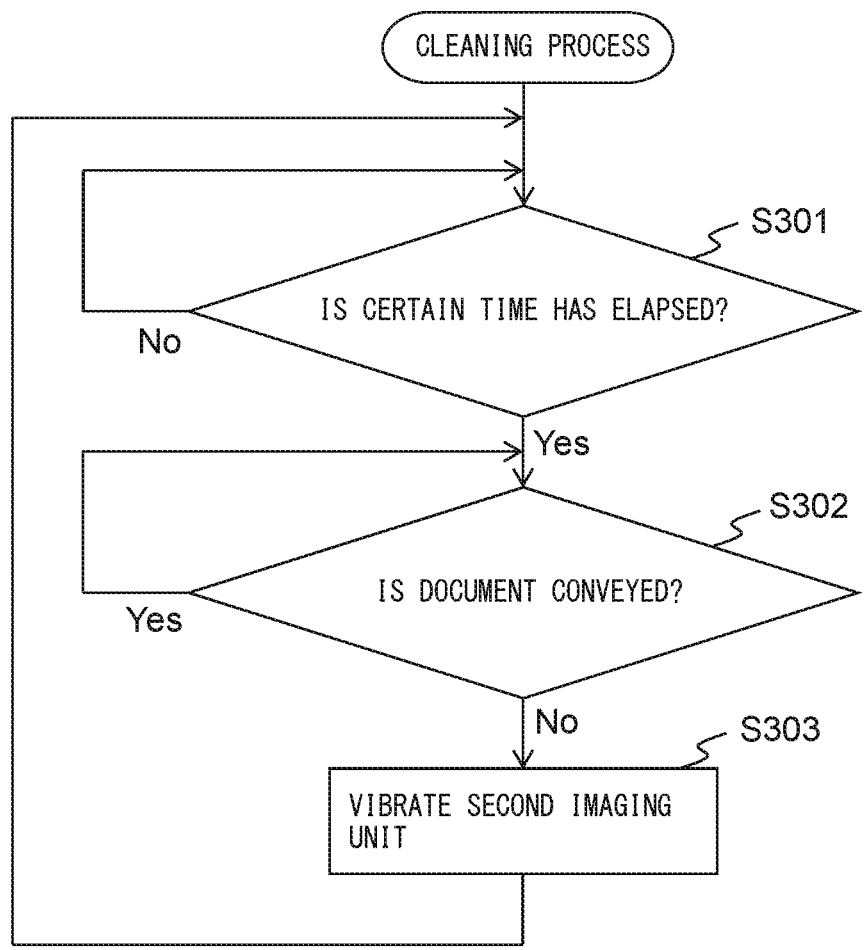
FIG. 19 is a flowchart illustrating an example of an operation of a cleaning process.

FIG. 19 is a flowchart illustrating an example of the operation of the cleaning process.

With reference to the flowchart illustrated in FIG. 19, an example of the operation of the cleaning process of the image reading apparatus 100 or 200 is described below. The flow of the operation described below is mainly executed by the CPU 300 in cooperation with each element of the image reading apparatus 100 or 200 based on the program stored in the storage device 301 in advance.

First, the control module 166 waits until a certain time (for example, 10 minutes) elapses from when the device is activated or from the previous cleaning (processing in step S303 described later) (step S301).

When a certain time has elapsed from when the device is activated or from the previous cleaning, the control module 166 determines whether currently the document is conveyed (step S302), and when the document is conveyed, the control module 166 waits until the document conveyance is completed.

On the other hand, when currently the document is not conveyed, the control module 166 causes the second motor 314*b* to generate the first drive force and the second drive force (step S303) so as to vibrate the second imaging unit 130*b*, and ends the series of steps. For example, the control module 166 causes the second motor 314*b* to alternately generate the first drive force and the second drive force at a certain interval (for example, 0.1 second) and continuously raises and lowers the second imaging unit 130*b*. Consequently, the control module 166 can spin off foreign object such as tape and paper powder adhered to a second glass surface 135*b* of the second imaging unit 130*b* from the document conveyed at the time of the conveyance of the document onto the first glass surface 135*a* of the first imaging unit 130*a*. As described above, the foreign object shaken off onto the first glass surface 135*a* is removed by conveying the leading edge of the document along the first glass surface 135*a* when the next document is conveyed.

In this way, the second imaging unit 130*b* is movably provided by the drive force of the second motor 314*b* so that the image reading apparatus 100 or 200 can clean the second imaging unit 130*b*.

Figure 20:
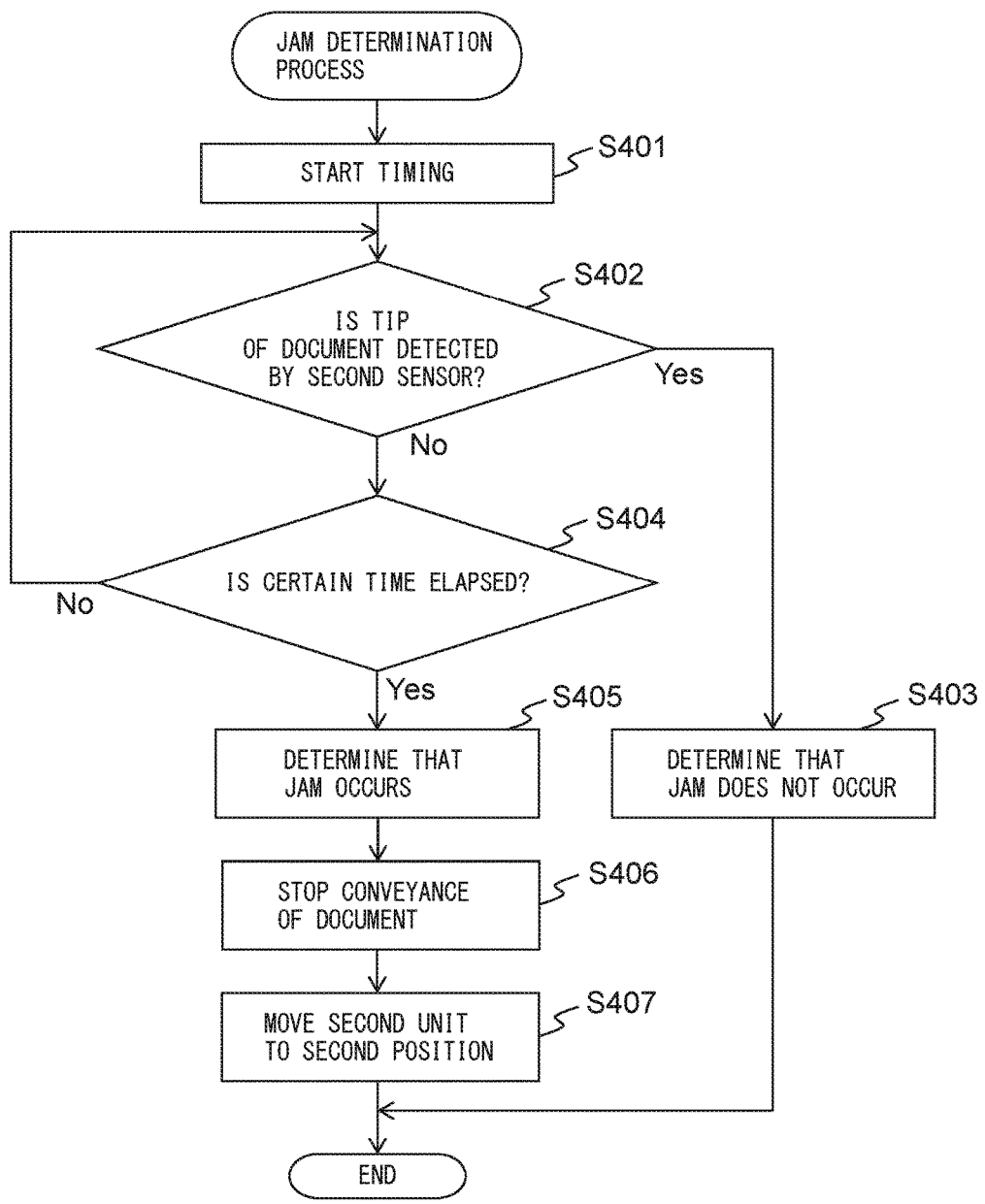
FIG. 20 is a flowchart illustrating an example of the operation of a jam determination process.

FIG. 20 is a flowchart illustrating an example of the operation of the jam determination process.

With reference to the flowchart illustrated in FIG. 20, an example of the operation of the jam determination process of the image reading apparatus 100 or 200 is described below. The flow of the operation described below is mainly executed by the CPU 300 in cooperation with each element of the image reading apparatus 100 or 200 based on the program stored in the storage device 301 in advance. The flow of the operation illustrated in FIG. 20 is executed each time the document is conveyed.

First, the abnormality determination module 167 starts the timing when the conveyance of the document is started (step S401).

Next, the abnormality determination module 167 determines whether the leading edge of the document is detected by the second sensor 118 (step S402). The abnormality determination module 167 determines that the second sensor 118 detects the leading edge of the document when the value of the second document detection signal from the second sensor 118 changes from a value representing a state in which the document is absent to a value representing a state in which the document is present. At this time, the leading edge of the document is positioned downstream of the first conveyance roller 116 and the first driven roller 117 and is positioned upstream of the imaging unit 130.

When the leading edge of the document is detected by the second sensor 118, the abnormality determination module 167 determines that the jam does not occur (step S403) and ends the series of steps.

On the other hand, when the leading edge of the document is not detected by the second sensor 118, the abnormality determination module 167 determines whether a certain time (for example, one second) elapses from when the timing is started (step S404). If a certain time does not elapse, the process of the abnormality determination module 167 returns to step S402, and the abnormality determination module 167 determines again whether the leading edge of the document is detected by the second sensor 118.

On the other hand, when a certain time has elapsed, the abnormality determination module 167 determines that the jam occurs (step S405).

Next, the control module 166 stops driving the first motor 314a via a first motor drive circuit 315a and stops the conveyance of the document (step S406).

Next, the control module 166 drives the second motor 314b via a second motor drive circuit 315b, moves the second imaging unit 130b to the second position (step S407), and ends the series of steps. After moving the second imaging unit 130b to the second position, the abnormality determination module 167 may drive the first motor 314a, cause the document to be conveyed to the document tray 103 side, and conduct the recovery process of the document.

Figure 21:
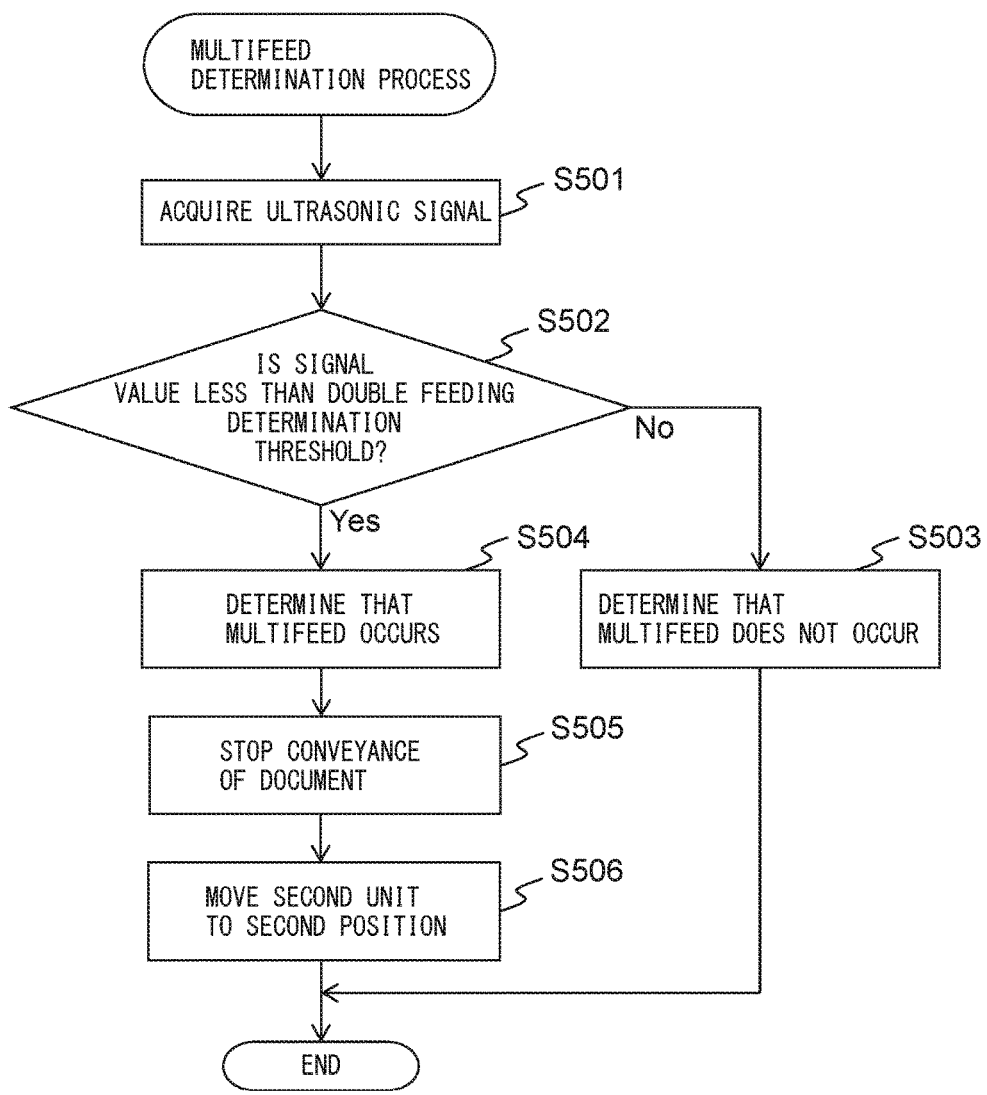
FIG. 21 is a flowchart illustrating an example of the operation of the multifeed determination process.

FIG. 21 is a flowchart illustrating an example of the operation of the multifeed determination process.

With reference to the flowchart illustrated in FIG. 21, an example of the operation of the multifeed determination process of the image reading apparatus 100 or 200 is described below. The flow of the operation described below is mainly executed by the CPU 300 in cooperation with each element of the image reading apparatus 100 or 200 based on the program stored in the storage device 301 in advance. The flow of the operation illustrated in FIG. 21 is conducted each time the document is conveyed.

First, the abnormality determination module 167 acquires an ultrasonic signal from an ultrasonic sensor 115 via an ultrasonic sensor output reading circuit 313 (step S501).

Next, the abnormality determination module 167 determines whether the signal value of the acquired ultrasonic signal is less than a multifeed determination threshold (step S502).

When the signal value of the ultrasonic signal is equal to or above the multifeed determination threshold, the abnormality determination module 167 determines that the multifeed of the document does not occur (step S503) and ends the series of steps.

On the other hand, when the signal value of the ultrasonic signal is less than the multifeed determination threshold, the abnormality determination module 167 determines that the multifeed of the document occurs (step S504).

Next, the control module 166 stops driving the first motor 314a via the first motor drive circuit 315a and stops the conveyance of the document (step S505).

Next, the control module 166 drives the second motor 314b via the second motor drive circuit 315b, moves the second imaging unit 130b to the second position (step S506), and ends the series of steps. After moving the second imaging unit 130b to the second position, the control module 166 may drive the first motor 314a, cause the document to be conveyed to the document tray 103 side, and conduct the recovery process of the document.

In this way, the abnormality determination module 167 determines whether the jam or the multifeed of the document occurs and when the abnormality determination module 167 determines that the jam or the multifeed of the document occurs, the control module 166 controls the second motor 314b such that the second imaging unit 130b is set to the second position. The control module 166 moves the second imaging unit 130b away from the document conveyance path so as to enable the prevention of the further damage to the document where the jam occurs. When the multifeed occurs, the documents placed on the document tray 103 are conveyed in a bundle, and it is possible that the leading edge of the uppermost or the lowermost document among the conveyed documents may enter the gap between the document conveyance path and the imaging unit 130. Accordingly, by moving the second imaging unit 130b away from the document conveyance path, the control module 166 can reliably prevent the damage to the document where the multifeed occurs.

Figure 22:
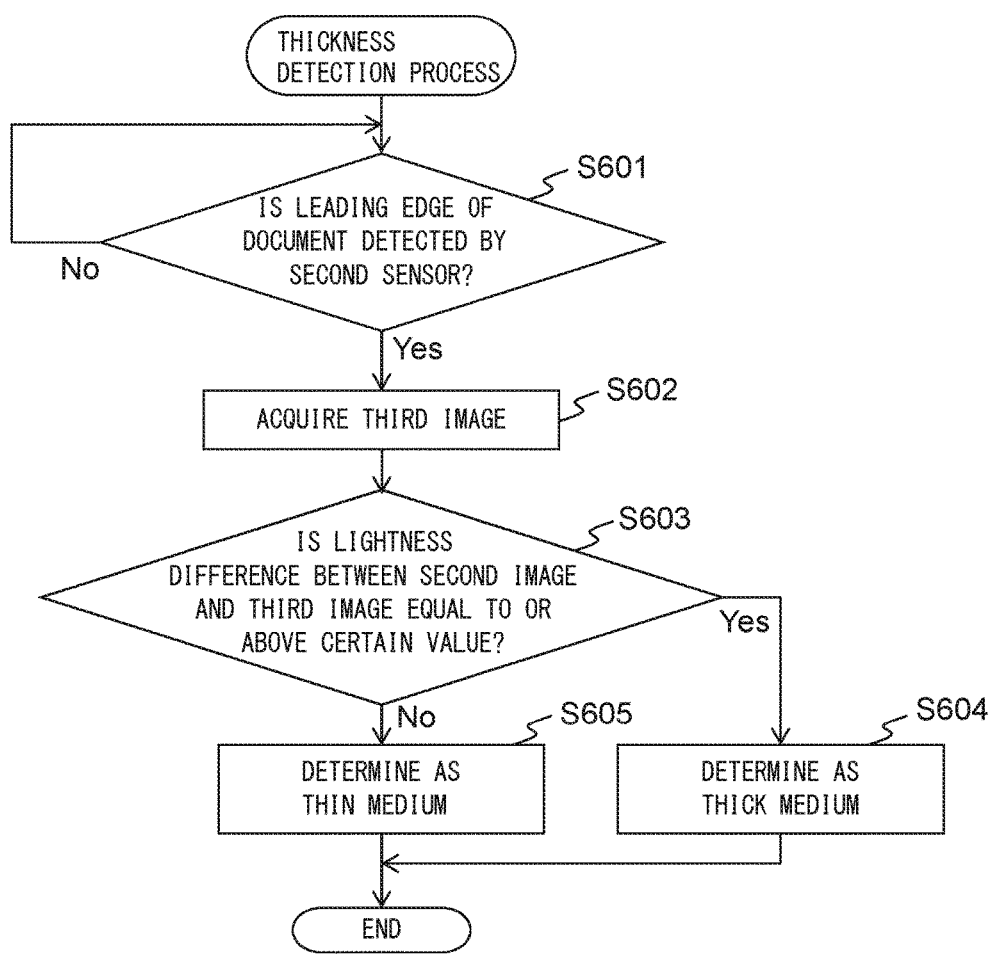
FIG. 22 is a flowchart illustrating an example of the operation of a thickness detection process.

FIG. 22 is a flowchart illustrating an example of the operation of the thickness detection process.

With reference to the flowchart illustrated in FIG. 22, an example of the operation of the thickness detection process of the image reading apparatus 100 or 200 is described below. The flow of the operation described below is mainly executed by the CPU 300 in cooperation with each element of the image reading apparatus 100 or 200 based on the program stored in the storage device 301 in advance. The flow of the operation illustrated in FIG. 22 is conducted each time the document is conveyed. Before the thickness detection process illustrated in FIG. 22 is conducted, it is assumed that a second image is acquired in the same manner as in step S105 of FIG. 12.

As in step S402 of FIG. 20, first, the thickness detection module 168 determines whether the leading edge of the document is detected by the second sensor 118 (step S601) and waits until the leading edge of the document is detected by the second sensor 118. When the leading edge of the document is detected by the second sensor 118, the leading edge of the document is conveyed to the position of the guide member 121 (before imaging unit 130).

Next, the thickness detection module 168 drives an image capturing device drive circuit 311, causes the first image capturing device 133a and the second image capturing device 133b to capture the third image, and acquires each third image (step S602). In other words, the third image captured by the first image capturing device 133a is an image obtained by capturing an image of a second reference member 134b when the document is conveyed to the position of the guide member 121. On the other hand, the third image captured by the second image capturing device 133 is an image obtained by capturing an image of a first reference member 134a when the document is conveyed to the position of the guide member 121.

Next, the thickness detection module 168 determines whether the lightness difference between the second image and the third image is equal to or above a certain value (step S603). For example, the thickness detection module 168 calculates the average value of the lightness value of each pixel in the second image and the average value of the lightness value of each pixel in the third image, assumes the absolute value of the difference between the respective calculated average values as the lightness difference, and determines whether the lightness difference is equal to or above the certain value.

As described above, the second image captured by the first image capturing device 133a is an image obtained by capturing an image of the second reference member 134b in which when the document is not conveyed, the second motor 314b is caused to generate the first drive force and thereby moving the second imaging unit 130b to the second position. On the other hand, the second image captured by the second image capturing device 133b is an image obtained by capturing an image of the first reference member 134a in which when the document is not conveyed, the second motor 314b is caused to generate the first drive force, and thereby setting the second imaging unit 130b to the second position.

When the lightness difference between the second image and the third image is less than the certain value, the thickness detection module 168 determines that the document to be conveyed is a thick medium such as thick paper, bank card, and credit card (step S604) and ends the series of steps.

On the other hand, when the lightness difference between the second image and the third image is equal to or above the certain value, the thickness detection module 168 determines that the document to be conveyed is a thin medium such as copy paper, printing paper, and photographic paper (step S605) and ends the series of steps.

In this way, the thickness detection module 168 compares the second image with the third image to detect the thickness of the conveyed documents. When the interval between the first imaging unit 130a and the second imaging unit 130b changes, the brightness of the image of a reference member 134 captured by an image capturing device 133 changes. When the thin medium is conveyed to the position of the guide member 121, since the position of the second imaging unit 130b remains at the first position (initial position), the brightness of the third image is largely different from the brightness of the second image (becomes larger). On the other hand, when the thick medium is conveyed to the position of the guide member 121, since the second imaging unit 130b moves toward the second position, the brightness of the third image approaches the brightness of the second image. By comparing the second image with the third image, the thickness detection module 168 can accurately detect the thickness of the conveyed documents.

The thickness detection module 168 may not only determine whether the document to be conveyed is a thick medium or a thin medium but may determine the thickness of the conveyed documents. In this case, the image reading apparatus 100 calculates in advance the lightness difference between the second image and the third image when various kinds of documents having different thicknesses are conveyed, and stores in the storage device 301 a table indicating the relationship between the thickness of the document and the lightness difference between the second image and the third image. The thickness detection module 168 refers to the table stored in the storage device 301 and determines the thickness of the document corresponding to the calculated lightness difference between the second image and the third image.

The thickness detection module 168 compares the first image acquired at step S102 of the foreign object determining process illustrated in FIG. 12 with the third image to detect the thickness of the conveyed documents. In that case, the thickness detection module 168 calculates the average value of the lightness value of each pixel in the first image. Next, the thickness detection module 168 calculates the absolute value (first lightness difference) of the difference between the average value of the lightness value in the second image and the average values of the lightness value in first image and the absolute value (second lightness difference) of the difference between the average value of the lightness value in the third image and the average values of the lightness value in the first image. The thickness detection module 168 determines whether the ratio of the second lightness difference to the first lightness difference is equal to or above the certain ratio (for example, 0.5), and when the ratio is equal to or above the certain ratio, the thickness detection module 168 determines that the document is the thick medium, and when the ratio is less than the certain ratio, the thickness detection module 168 determines that the document is the thin medium. By comparing the third image with both the first image and the second image, the thickness detection module 168 can accurately detect the thickness of the document.

How to use the thickness of the document to be conveyed is described below.

For example, in step S502 of the multifeed determination process illustrated in FIG. 21, when the signal value of the ultrasonic signal is less than the multifeed determination threshold, the abnormality determination module 167 may determine whether the multifeed of the document occurs depending on the thickness of the document. When the document is the thick medium, the abnormality determination module 167 determines that the multifeed of the document does not occur, and when the document is not the thick medium, the abnormality determination module 167 determines that the multifeed of the document occurs. Consequently, when the thick medium is conveyed, the signal value of the ultrasonic signal passing through the medium is lowered and erroneous determination that the multifeed of the document occurs is suppressed.

Further, the control module 166 may conduct the motor torque adjustment process for changing the generated torque of the first motor 314a or the second motor 314b depending on the thickness of the document. If the thick medium is conveyed with the same torque as when the document is the thin medium, it is possible that a step out of the motor occurs. Therefore, when the document is the thick medium, the control module 166 increases the generated torque of each motor compared with when the document is the thin medium.

For example, the control module 166 increases a maximum current value to be applied to each motor so as to increase the generated torque of each motor. The control module 166 changes an excitation system of each motor from the 1-phase excitation system to the 2-phase excitation system so as to increase a drive current area of the coil of each motor per unit of time and increase the generated torque of each motor. When each motor is driven by micro-step drive also, the control module 166 may increase the drive current area of the coil of each motor per unit of time and increase the generated torque of each motor. Consequently, the occurrence of the step out of the motor is suppressed.

The image generating module 164 may conduct the image processing based on the thickness of the document. When the document is the thin medium, since the thickness of the document is sufficiently smaller than the gap between the second imaging unit 130b and the first imaging unit 130a at the initial position (first position), the interval between the back surface of the document and the second imaging unit 130b becomes relatively large. On the other hand, when the document is the thick medium, since the imaging unit guide 120 contacts with the document and the second imaging unit 130b moves following the thickness of the document, the interval between the back surface of the document and the second imaging unit 130b becomes relatively small. As a result, when the document is the thick medium, the brightness of the image data of the back surface of the document tends to be larger compared with when the document is the thin medium. Thus, when the document is the thick medium, the image generating module 164 corrects the shading correction data for the back surface of the document such that the document image obtained by capturing an image of the back surface of the document is corrected to be darker.

When the document is the thick medium, since the interval between the back surface of the document and the second imaging unit 130b becomes narrow, a focal point comes off. Therefore, when the document is the thick medium, the image generating module 164 may apply the unsharp mask processing to the document image obtained by capturing an image of the back surface of the document.

When the document is the thick medium, compared with when the document is the thin medium, the brightness of the background area in the document image is lowered and the change in the brightness of the boundary between the document area and the background area becomes gentle. In that case, the detection accuracy of the edge deteriorates and it is possible that the document area may not be cut out correctly in the cropping process. Therefore, when the document is the thick medium, the image generating module 164 may correct a threshold value used for detecting the edge in the cropping process. For example, when the document is the thick medium, the image generating module 164 corrects the threshold value for comparing with the difference value between mutually adjacent pixels in the document image such that the threshold value for detecting the edge becomes small.

Thus, the image generating module 164 can conduct the image processing with higher accuracy.

Fourth Embodiment

Figure 23:
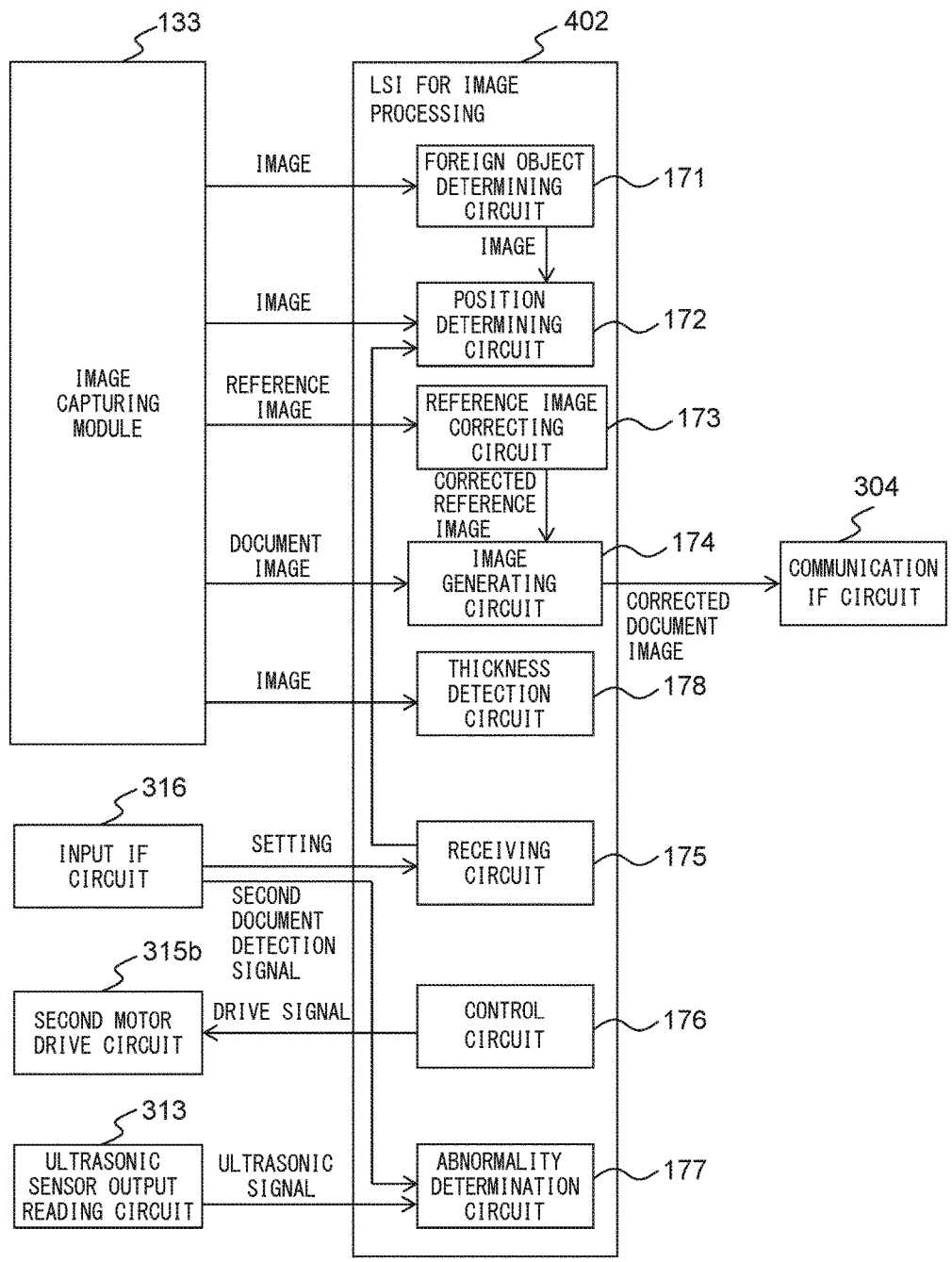
FIG. 23 is a block diagram illustrating a schematic configuration of another LSI 402 for image processing.

FIG. 23 is a block diagram illustrating a schematic configuration of an LSI 402 for image processing in an image reading apparatus according to another embodiment.

The LSI 402 for image processing is used instead of the LSI 302 for image processing of the image reading apparatus 100, and instead of the CPU 300, conducts the foreign object determining process, the document reading process, the cleaning process, the jam determination process, the multifeed determination process and the thickness detection process, etc. The LSI 402 for image processing includes a foreign object determining circuit 171, a position determining circuit 172, a reference image correcting circuit 173, an image generating circuit 174, a receiving circuit 175, a control circuit 176, an abnormality determination circuit 177 and a thickness detection circuit 178, etc.

The foreign object determining circuit 171 is one example of a foreign object determining module, and has the same function as that of the foreign object determining module 161. The foreign object determining circuit 171 receives the respective images from the image capturing device 133, and determine whether or not a foreign object appears in the respective images.

The position determining circuit 172 is one example of a position determining module, and has the same function as that of the position determining module 162. When the foreign object determining circuit 171 determines that a foreign object appears in the images, the position determining circuit 172 receives the images from the image capturing device 133, and determines whether the foreign object exists on the image capturing device side or on the reference member side, based on the respective images.

The reference image correcting circuit 173 is one example of a reference image correcting module, and has the same function as that of the reference image correcting module 163. The reference image correcting circuit 173 acquires the reference image from the image capturing device 133. The reference image correcting circuit 173 does not correct the reference image when the foreign object exists on the image capturing device side, but corrects the reference image when the foreign object exists on the reference member side.

The image generating circuit 174 is one example of an image generating module, and has the same function as that of the image generating module 164. The image generating circuit 174 acquires a document image from the image capturing device 133, uses the reference image to correct the document image, and transmits the corrected document image to the information processing device 10 via the communication IF circuit 304.

The receiving circuit 175 is one example of a receiving module, and has the same function as that of the receiving module 165. The receiving circuit 175 receives from the input IF circuit 316 the setting that indicates which of a single color and a plurality of colors is used to capture an image of a document.

The control circuit 176 is one example of the control module and has a function similar to that of the control module 166. The control circuit 176 transmits a drive signal to the second motor drive circuit 315b and causes the second motor 314b to generate the drive force. When the document is not conveyed, the control circuit 176 causes the second motor 314b to generate the first drive force to move the second image capturing device and when the document is conveyed, the control circuit 176 causes the second motor 314b to generate the second drive force to convey the document to the first conveyance roller 116.

The abnormality determination circuit 177 is one example of the abnormality determination module and has a function similar to that of the abnormality determination module 167. The abnormality determination circuit 177 receives the second document detection signal from the second sensor 118 to determine whether the jam of the document occurs and receives the ultrasonic signal from the ultrasonic sensor 115 to determine whether the multifeed of the document occurs.

The thickness detection circuit 178 is one example of the thickness detection module and has a function similar to that of the thickness detection module 168. The thickness detection circuit 178 acquires the second image and the third image from the image capturing device 133, compares the second image with the third image, and then detects the thickness of the conveyed documents.

As described above in detail, even when the LSI 402 for image processing is used, the image reading apparatus can forcibly move the second imaging unit 130b provided so as to be moved by the document to be conveyed at the appropriate timing.

REFERENCE SIGNS LIST 100 image reading apparatus
116 first conveyance roller
120 imaging unit guide
130a first imaging unit
130b second imaging unit 140 second conveyance roller
133a first image capturing device
133b second image capturing device
134a first reference member
134b second reference member
314b second motor
161 foreign object determining module
162 position determining module
166 control module
167 abnormality determination module
168 thickness detection module
201 arm
203a to 203c first to third gears
204 planet gear
205 cam

What is claimed is:

1. An image reading apparatus comprising:
a first imaging device secured to the image reading apparatus;
a second imaging device movably provided between a first position facing the first imaging device and a second position facing the first imaging device, wherein the second position is at a longer distance from the first imaging device than the first position;
a guide for guiding a document between the first imaging device and the second imaging device;
an image capturing device provided on one of the first imaging device and the second imaging device for capturing an image of the document guided by the guide;
a drive force generating device for generating a first drive force for moving the second imaging device by a rotation in a first direction and generating a second drive force by a rotation in a second direction opposite to the first direction;
a conveyance roller;
a drive force transmitter arranged between the drive force generating device, and the second imaging device and the conveyance roller; and
a processor configured to cause the drive force generating device to generate the first drive force when the document is not conveyed, wherein
the drive force transmitter
transmits the first drive force to the second imaging device to move the second imaging device, and
transmits the second drive force to the conveyance roller to convey the document and interrupts transmission of the second drive force to the second imaging device in response to a switching from the first drive force to the second drive force.

2. The image reading apparatus according to claim 1, wherein
the drive force transmitter includes a planet gear and transmits the first drive force to the second imaging device via the planet gear; and wherein
a transmission of the second drive force to the second imaging device is interrupted by changing a connection of the planet gear in response to the switching from the first drive force to the second drive force.

3. The image reading apparatus according to claim 1, wherein
the image capturing device captures a first image and a second image; and
the image reading apparatus further comprises a reference member provided with the image capturing device in the first imaging device or the second imaging device, wherein the processor
determines whether a foreign object is present in the first image, and
determines whether a position where the foreign object is present is on the image capturing device side or on the reference member side based on an absolute value of a difference between a gradation value of a first area where the foreign object is present in the first image and a gradation value of an area corresponding to a second area where the foreign object is present in the second image, when the foreign object is present in the first image, and wherein
the first image is an image obtained by capturing an image of the reference member by setting the second imaging device at one of the first position and the second position, and the second image is an image obtained by capturing an image of the reference member by setting the second imaging device at the other one of the first position and the second position.

4. The image reading apparatus according to claim 1, wherein
the second imaging device is provided above the first imaging device, wherein
the drive force generating device generates the first drive force by the rotation in the first direction and generates the second drive force by the rotation in the second direction opposite to the first direction, wherein
the processor causes the drive force generating device to generate the first drive force and the second drive force so as to vibrate the second imaging device, and wherein
the image reading apparatus further comprises a conveyance mechanism for conveying the document between the first imaging device and the second imaging device such that a leading edge of the document contacts with a surface of the first imaging device.

5. The image reading according to claim 1, wherein
the processor
determines whether a jam or a multifeed of the document occurs, and
controls the drive force generating device such that the second imaging device is set to the second position when the processor determines that the jam or the multifeed of the document occurs.

6. The image reading apparatus according to claim 1 further comprising a reference member provided with the image capturing device in the first imaging device or the second imaging device, wherein
the processor compares an image obtained by capturing an image of the reference member by moving the second imaging device to the second position by causing the drive force generating device to generate the first drive force when the document is not conveyed, and an image obtained by capturing an image of the reference member when the document is conveyed to detect a thickness of the conveyed document.

7. A control method of an image reading apparatus including a first imaging device secured to the image reading apparatus, a second imaging device movably provided between a first position facing the first imaging device and a second position facing the first imaging device, a guide for guiding the a document between the first imaging device and the second imaging device, an image capturing device provided on one of the first imaging device and the second imaging device for capturing an image of the document guided by the guide, a drive force generating device for generating a first drive force for moving the second imaging device by a rotation in a first direction and generating a second drive force by a rotation in a second direction opposite to the first direction, a conveyance roller, and a drive force transmitter arranged between the drive force generating device, and the second imaging device and the conveyance roller, the method comprising:

causing the drive force generating device to generate the first drive force when the document is not conveyed;

transmitting, by the drive force transmitter, the first drive force to the second imaging device to move the second imaging device, and transmitting, by the drive force transmitter, the second drive force to the conveyance roller to convey the document; and interrupting, by the drive force transmitter, transmission of the second drive force to the second imaging device in response to a switching from the first drive force to the second drive force.

8. A computer-readable, non-transitory medium storing a computer program, wherein the computer program causes an image reading apparatus including a first imaging device secured to the image reading apparatus, a second imaging device movably provided between a first position facing the first imaging device and a second position facing the first imaging device, a guide for guiding a document between the first imaging device and the second imaging device, an image capturing device provided on one of the first imaging device and the second imaging device for capturing an image of the document guided by the guide, a drive force generating device for generating a first drive force for moving the second imaging device by a rotation in a first direction and generating a second drive force by a rotation in a second direction opposite to the first direction, a conveyance roller, and a drive force transmitter arranged between the drive force generating device, and the second imaging device and the conveyance roller, to execute a process, the process comprising:

causing the drive force generating device to generate the first drive force when the document is not conveyed;

transmitting, by the drive force transmitter, the first drive force to the second imaging device to move the second imaging device, and transmitting, by the drive force transmitter, the second drive force to the conveyance roller to convey the document; and interrupting, by the drive force transmitter, transmission of the second drive force to the second imaging device in response to a switching from the first drive force to the second drive force.

* * * * *

UNITED STATES PATENT AND TRADEMARK OFFICE
CERTIFICATE OF CORRECTION

PATENT NO. : 10,462,325 B2  
APPLICATION NO. : 16/080605  
DATED : October 29, 2019  
INVENTOR(S) : Kazuhito Seki et al.

Page 1 of 1

It is certified that error appears in the above-identified patent and that said Letters Patent is hereby corrected as shown below:

On the Title Page

Column 2, Item (57), Abstract, Line 9     delete "and" and insert -- or --

In the Claims

Column 30, Line 30, Claim 4     delete "so as to" and insert -- to --

Column 30, Line 36, Claim 5     delete "reading" and insert -- reading apparatus --

Column 30, Line 61, Claim 7     delete "the a" and insert -- a --

Signed and Sealed this  
Thirteenth Day of October, 2020

Andrei Iancu  
*Director of the United States Patent and Trademark Office*